(12) United States Patent
Bender et al.

(10) Patent No.: US 9,293,066 B2
(45) Date of Patent: *Mar. 22, 2016

(54) KIT OF PRE-CONSTRUCTION SAMPLES FOR REPLICATING CONSTRUCTION PRODUCTS

(71) Applicants: James J. Bender, Ballwin, MO (US); David J. Bender, Ballwin, MO (US)

(72) Inventors: James J. Bender, Ballwin, MO (US); David J. Bender, Ballwin, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 14/537,710

(22) Filed: Nov. 10, 2014

(65) Prior Publication Data

US 2015/0064660 A1    Mar. 5, 2015

Related U.S. Application Data

(63) Continuation of application No. 13/917,496, filed on Jun. 13, 2013, now Pat. No. 8,961,182, which is a continuation of application No. 12/748,215, filed on Mar. 26, 2010, now abandoned, which is a continuation-in-part of application No. 12/605,116, filed on Oct. 23, 2009, now Pat. No. 8,241,039.

(60) Provisional application No. 61/236,015, filed on Aug. 21, 2009.

(51) Int. Cl.
*G09B 25/00* (2006.01)
*G09B 25/04* (2006.01)

(52) U.S. Cl.
CPC .............. *G09B 25/04* (2013.01); *G09B 25/00* (2013.01)

(58) Field of Classification Search
USPC .................................. 434/72, 74, 75, 79, 80
See application file for complete search history.

(56) References Cited

U.S. PATENT DOCUMENTS

| | | |
|---|---|---|
| 3,965,586 A | 6/1976 | Roosli |
| 4,248,018 A | 2/1981 | Casamayor |
| 4,253,259 A | 3/1981 | Schaffer et al. |
| 4,652,239 A | 3/1987 | Brimberg |
| 4,854,464 A | 8/1989 | Kim |
| 4,902,229 A | 2/1990 | Pedersen et al. |
| 5,219,457 A | 6/1993 | Graves |

(Continued)

FOREIGN PATENT DOCUMENTS

| | | |
|---|---|---|
| DE | 3600257 | 7/1987 |
| DE | 4438204 | 6/1995 |

(Continued)

OTHER PUBLICATIONS

Press Release from Formica on new 180fx.TM. product (Aug. 3, 2009), miscellaneous website pages, and 180fx.Tm. product brochure from www.formica.com (13 pages).

(Continued)

*Primary Examiner* — Kurt Fernstrom
(74) *Attorney, Agent, or Firm* — Nixon Peabody LLP

(57) ABSTRACT

The present invention is a pre-construction sample that is made of a flexible material and has a product image corresponding to an actual construction product. The pre-construction sample is preferably at least 18 inches in one dimension. The pre-construction sample is preferably produced by a printing process having at least 200 dpi, and more preferably 300 dpi. Kits of pre-construction samples are provided to assist the consumer choosing from among various construction products, such as flooring, decking, countertops, cabinets, windows, shingles, among others.

20 Claims, 17 Drawing Sheets

(56) References Cited

U.S. PATENT DOCUMENTS

| | | | |
|---|---|---|---|
| D381,834 S | 8/1997 | Potter et al. | |
| 5,685,430 A | 11/1997 | Weisburn et al. | |
| 5,996,794 A | 12/1999 | Popovich | |
| 6,340,092 B1 | 1/2002 | McGrath, Jr. | |
| 6,524,107 B1 | 2/2003 | Brown | |
| 6,790,042 B2 | 9/2004 | Worth | |
| 6,840,773 B2 | 1/2005 | Anderson et al. | |
| D594,994 S | 6/2009 | Kimura et al. | |
| 7,543,417 B2 | 6/2009 | McIntosh et al. | |
| D595,870 S | 7/2009 | Moller, Jr. et al. | |
| D595,871 S | 7/2009 | Moller, Jr. et al. | |
| D599,917 S | 9/2009 | Kimura et al. | |
| 7,632,561 B2 | 12/2009 | Thiers | |
| 7,640,705 B2 | 1/2010 | Kornfalt et al. | |
| 7,914,285 B2 | 3/2011 | Boney | |
| 2005/0074583 A1* | 4/2005 | Gratopp et al. | 428/174 |
| 2005/0114703 A1 | 5/2005 | Allen, Jr. et al. | |
| 2006/0265978 A1 | 11/2006 | Stein et al. | |
| 2007/0298382 A1 | 12/2007 | Schilling | |
| 2008/0249894 A1* | 10/2008 | Madel | 705/27 |
| 2008/0264823 A1 | 10/2008 | Siegel | |
| 2009/0044466 A1 | 2/2009 | Andres | |

FOREIGN PATENT DOCUMENTS

| | | |
|---|---|---|
| EP | 0387902 | 3/1990 |
| WO | 91/12940 | 9/1991 |
| WO | 00/53865 | 9/2000 |

OTHER PUBLICATIONS

International Search Report for International Application No. PCT/US2010/045611 dated Jan. 6, 2012 (4 pages).

International Written Opinion for International Application No. PCT/US2010/045611 dated Jan. 6, 2012 (5 pages).

\* cited by examiner

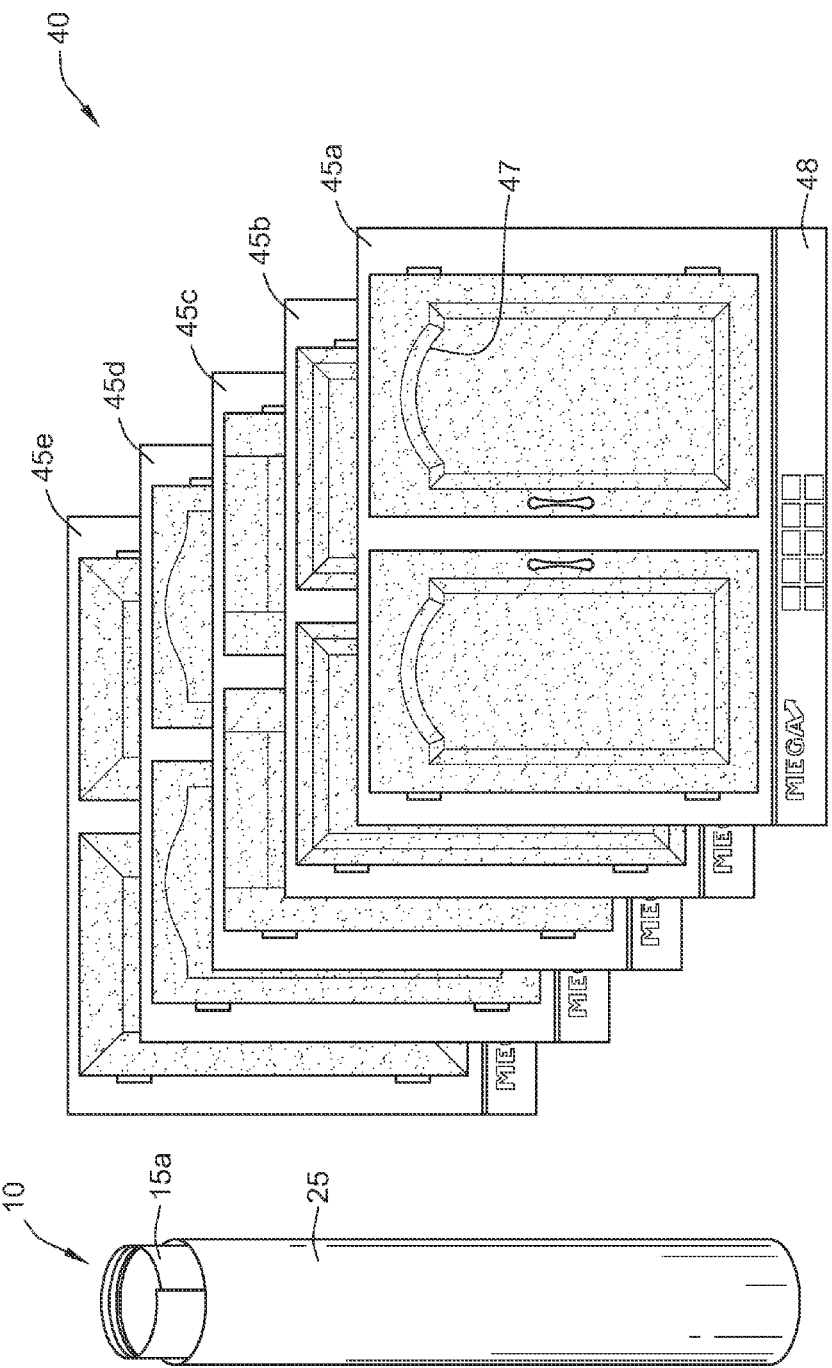

KIT OF PRE-CONSTRUCTION SAMPLES FOR REPLICATING CONSTRUCTION PRODUCTS

CROSS REFERENCE TO RELATED APPLICATIONS

This application is a continuation of U.S. Ser. No. 13/917,496, filed Jun. 13, 2013, and titled "Kit Of Pre-Construction Samples For Replicating Construction Products," now allowed, which is a continuation of U.S. Ser. No. 12/748,215, filed Mar. 26, 2010, and titled "Kit Of Pre-Construction Samples For Replicating Construction Products," abandoned, which is a continuation-in-part of U.S. Ser. No. 12/605,116, filed Oct. 23, 2009, and titled "Kit Of Pre-Construction Samples For Replicating Construction Products," now issued as U.S. Pat. No. 8,241,039 on Aug. 14, 2012, which claims the benefit of U.S. Provisional Patent Application No. 61/236,015, filed Aug. 21, 2009, and titled "Kit Of Flexible Samples For Replicating Construction Products", each of which is hereby incorporated by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to large-scale, lightweight pre-construction samples that replicate construction products to permit consumers to more easily choose from a variety of alternatives for a certain construction product, such as cabinets, countertops, and flooring.

BACKGROUND OF THE INVENTION

For consumers, when purchasing a new home or when conducting renovations to an existing home, the ideas and products used to decorate the desired locations can often be very difficult to imagine. Currently, manufacturers of remodeling and construction products will typically only provide a small piece of that product for the consumer to evaluate, with the idea being that the consumer will be able to imagine what the entire finished project will look like with the small piece of product. Examples of such small samples include a small square (perhaps 4 inches by 4 inches) of granite to be used on a countertop, a 2 inch by 2 inch square of a laminate countertop (e.g. Formica®), a few small planks of a wood flooring, a few sample pieces of a tile, or a sample piece of wood that is used for the cabinet.

It is not uncommon to see consumers carrying around these small samples as they shop for other related products. Consumers commonly carry a door (or doors) of cabinetry as they shop for a granite countertop or new flooring, or carry several pieces of tile to the cabinet shop, etc. Not only are these samples difficult to tote around, by many of them can be very heavy (e.g. samples of granite or tile). More importantly, the problem is that most people simply cannot visualize how the final end-product will look in their kitchens or bathrooms (or elsewhere around the home) with these small samples.

When remodeling, the options for the various construction products (e.g. cabinets, flooring, countertops) can be mind-boggling and there are often a large number of products that will change during the remodeling process. If a consumer has conducted their shopping and finally limited their selections to just three alternatives for cabinets, three alternatives for floors, and three alternatives for countertops, then that consumer still has 27 different combinations to evaluate. Trying to figure out what looks best with what can be very difficult, time-consuming, and stressful, leaving many consumers with buyer's remorse after the project is completed. When such a monetary investment is made in this type of project, the consumer must live with what was purchased, like it or not. Again, one primary reason for these problems is due to the fact that current product samples of flooring, cabinetry, counters, backsplashes, etc. are often way too small to compare to the existing home's floor, cabinets, and countertops, which leaves too much for the consumer's imagination.

From the retailers' point of view, they are saddled with the extra work associated with providing samples, and receiving the returned samples. Many times, the samples are provided in the form of sales, which then require credit upon returns. In many instances, the retailer is often required to ship the samples to the prospective consumers, creating more of a burden. Additionally, carrying extra product to be able to provide samples can be problematic. While it is known to print patterns for some construction products on large rolls of materials for creating laminate furniture or floors in the décor paper/foil industry, these large rolls of materials were provided to manufacturers of the finished consumer products (e.g., furniture manufacturers) to develop and assemble the final product. The large rolls of material are not for use by the end consumer. Nor are they provided in a form to the manufacturer that could be used by consumers, as is the case with the present invention. Nor are they provided in a form (e.g., a kit or a consumer-selected custom kit) for permitting end consumers to determine what would look best in their new home or renovation project.

Accordingly, there is a need is for a new type of pre-construction product samples that will allow the consumer to better visualize the end result of a new home construction or remodeling project. Preferably, that new pre-construction product sample is of a low cost and can be easily carried by the consumer. This pre-construction product sample will allow a consumer to feel more secure with his or her decisions, while not spending a lot of money and wasting a lot of time in the process.

SUMMARY OF THE INVENTION

The present invention is a pre-construction product sample made of a flexible material and having a product image corresponding to an actual construction product. The pre-construction sample is preferably at least 18 inches in one dimension. The construction sample is preferably produced by a printing process having at least 200 dpi, and preferably 300 dpi. The pre-construction product sample can be grouped with other samples to form a kit. The pre-construction sample may replicate wood-flooring, cabinets, countertops, decking, windows, shingles, among other construction products.

The present invention is also a kit of pre-construction product samples that are preferably made of a flexible material and have a product image corresponding to an actual construction product. The kit includes samples having different characteristics that correspond to different characteristics in the actual construction products.

The present invention also relates to the use of the kits of pre-construction samples and individual construction samples permitting a consumer to make easy selections based on a visualization of the construction sample, which usually occurs in the consumer's home.

The present invention further relates a kit of pre-construction wood-flooring samples, comprising a plurality of pre-construction wood-flooring samples. Each of the pre-construction wood-flooring samples is made of a flexible material and has a wood-flooring image replicating a wood floor. The kit includes pre-construction wood-flooring samples that have different characteristics. The wood-flooring image includes multiple wood planks having width dimensions that substantially correspond to dimensions of wood planks.

The invention also relates to a method of assisting a consumer with a selection of a wood floor, comprising providing a plurality of pre-construction wood-flooring samples that have images of wood-flooring products. Each of the pre-construction wood-flooring samples has at least a length or width dimension greater than 18 inches. A first pre-construction wood-flooring sample of the plurality of pre-construction wood-flooring samples has at least one different characteristic than a second pre-construction wood-flooring sample. The method includes laying the first pre-construction wood-flooring sample of the plurality of pre-construction wood-flooring samples over an existing flooring, and after the laying of the first pre-construction wood-flooring sample, comparing the first pre-construction wood-flooring sample with at least one existing structure in the vicinity of the first pre-construction wood-flooring sample. The method further includes laying a second pre-construction wood-flooring sample of the plurality of pre-construction wood-flooring samples over the existing flooring, and after the laying of the second pre-construction wood-flooring sample, comparing the second pre-construction wood-flooring sample with the at least one existing structure in the vicinity of the second pre-construction wood-flooring sample. While this method has been discussed relative to pre-construction wood-flooring samples, similar methods are applicable to other types of samples (e.g., countertop samples, cabinet samples, decking samples, window samples, etc.)

The present invention can also be described as a pre-construction wood-flooring sample for use by a consumer, comprising a substrate material having a size of at least 18 inches in width and in length. The substrate material includes a wood-flooring image that substantially replicates a wood-flooring product. The wood-flooring image is printed on the substrate material by a printing process having at least 200 dpi. And, the sample is moveable by a consumer when placed on a consumer's existing floor for contrasting the wood-flooring product relative to existing structures adjacent to the consumer's existing floor (e.g., cabinets, walls, furniture etc).

The present invention also includes a kit of pre-construction samples for replicating a plurality of different construction products, comprising a plurality of pre-construction samples that are made of paper. Each of the pre-construction samples has a printed image with a resolution of at least 200 dpi that replicates a corresponding one of the plurality of different construction products. The printed images of the plurality of pre-construction samples illustrate different characteristics associated with the plurality of different construction products. The printed images are substantially on a 1:1 scale with the corresponding construction product. The printed image has at least a length or width dimension of at least 18 inches. The pre-construction samples may replicate wood-flooring, cabinets, countertops, shingles, decking, countertops, among other construction products.

The present invention also is a kit of pre-construction cabinet samples, comprising, a plurality of pre-construction cabinet samples. Each of the pre-construction cabinet samples is made of a flexible material and has a cabinet image replicating a cabinet. The kit includes pre-construction cabinet samples that have different characteristics. The different characteristics at least includes different types of wood colors. Each of the pre-construction cabinet samples having a width or length dimension of at least 18 inches.

A further aspect of the present invention is kit of pre-construction countertop samples comprising a plurality of pre-construction countertop samples. Each of the pre-construction countertop samples is made of a flexible material and has a countertop image replicating a countertop. The kit includes pre-construction countertop samples having different characteristics and the different characteristics at least include different colors of a countertop material.

Another aspect of the present invention is a kit of pre-construction window samples comprising a plurality of pre-construction window samples. Each of the pre-construction window samples is made of a flexible material and has a window image replicating a window. The kit includes pre-construction window samples that have different characteristics. The different characteristics at least include different frames. Each of the pre-construction window samples has a width and a length dimension of at least 18 inches.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 3 illustrates the kit of pre-construction flooring samples provided in a package;

FIG. 4 illustrates a kit of different pre-construction cabinet samples;

DETAILED DESCRIPTION

Figure 1:
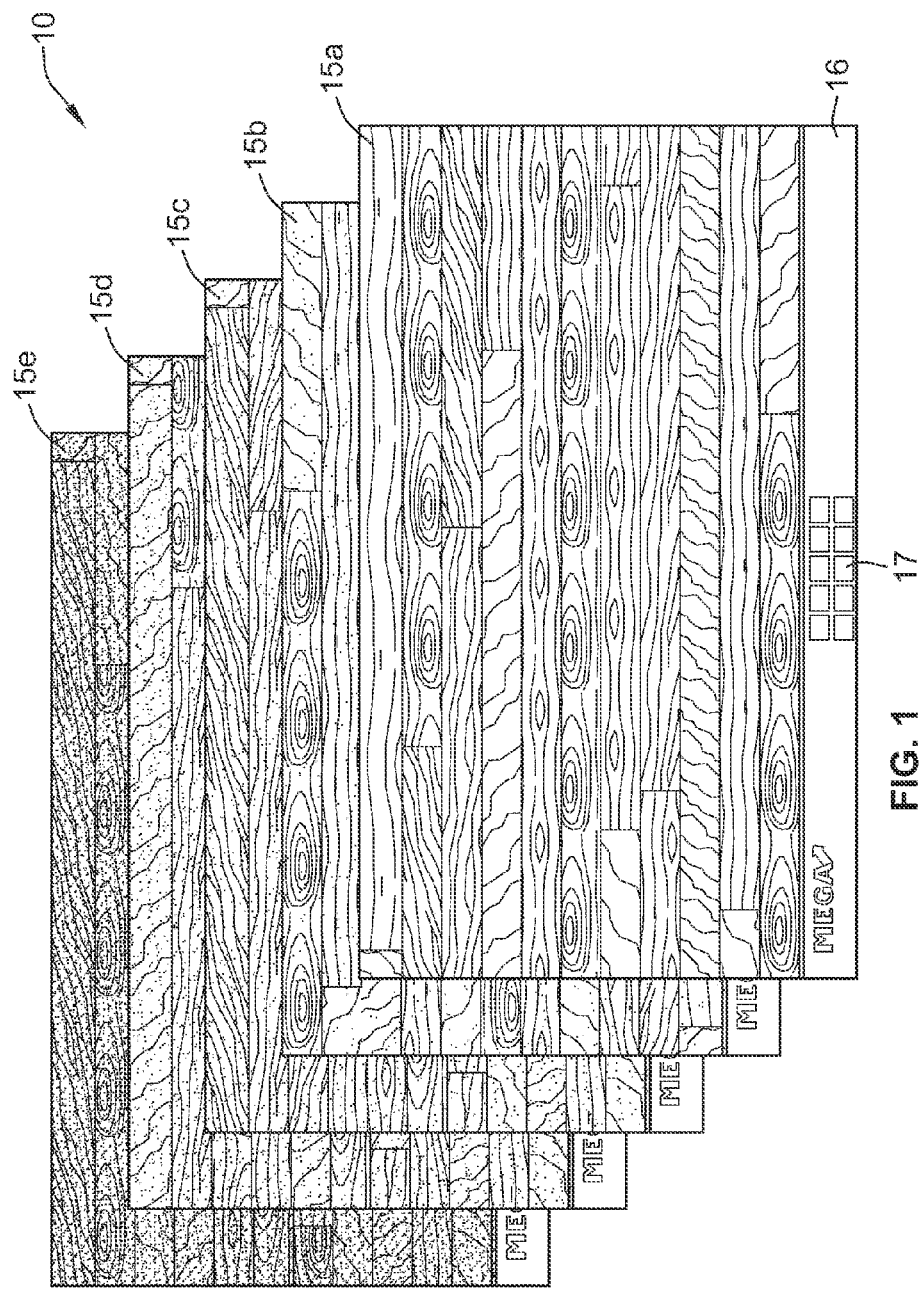
FIG. 1 illustrates a kit of different pre-construction flooring samples.

FIG. 1 illustrates a kit 10 of five pre-construction wood-flooring samples 15a, 15b, 15c, 15d, and 15e. The pre-construction wood-flooring samples 15 are preferably a large scale print having a size greater than roughly 18 inches in length and roughly 18 inches in width. These samples 15 are "pre-construction" in the sense that they will assist consumers with the product-selection process before the construction project is completed, as discussed below in more detail. For example, in one preferred embodiment, each of the pre-construction wood-flooring samples 15 has a size of about 24 inches by 37 inches (i.e., about 2 feet by 3 feet). The pre-construction wood-flooring samples 15 are made from a high-quality printing process (e.g., at least 200 dpi and preferably at least 300 dpi) based on a high-quality image of a wood floor. For example, the pre-construction wood-flooring samples 15 can be produced on a LS640 Komori commercial offset printing press. The pre-construction wood-flooring samples 15 may be printed on 80 lb gloss text paper, which makes each of the pre-construction samples 15 very lightweight.

The image on the pre-construction wood-flooring samples 15 is sized such that the planks on each sample 15 are of a size that is substantially the same as the size of the actual wood planks that a consumer would purchase (e.g. 2.5 inch planks). Commonly known wood floors have planks sizes of 2.25 inches, 2.5 inches 3 inches, 4 inches, 5 inches, 5.25 inches, and up to 7 inches. In other words, the pre-construction wood-flooring samples 15 are preferably of a scale that is substantially a 1:1 scale with the actual wood floor that the consumer would purchase. To produce the pre-construction sample 15, multiple photographs (or a high-resolution larger, single photo) may be taken of the wood-flooring product that are merged together via software (e.g., Photoshop®) to produce a final image of 7200 pixels by 10,320 pixels, which permits a 300 dpi outputted print for the pre-construction wood-flooring sample 15 having a size of 24 inches by 37 inches. For example, the pre-construction sample can be shot with a high-resolution camera that is used in the advertising industry (e.g., a Phase One P45 Camera with 30 MP sensor or a Hasselblad H4D series camera) When a pre-construction wood-flooring sample 15 is made from an image of this high resolution, the pre-construction wood-flooring sample 15 very closely replicates an actual wood floor, such that when it is placed over an existing floor, most consumers would have the perception that it is an actual wood floor.

Each of the pre-construction wood-flooring samples 15 is different from the other samples 15 by some characteristic associated with wood flooring. For example, the difference between the wood-flooring samples 15 may relate to the tone of the wood in terms of it being a light-colored wood, a medium-colored wood, or a dark-colored wood. Alternatively, the difference between the pre-construction wood-flooring samples 15 may relate to the type of wood (e.g. oak, pine, or bamboo) and/or the surface texture of the wood (e.g., normal or distressed wood). In a further alternative, the difference between the pre-construction wood-flooring samples 15 may relate to the size of the planks on each pre-construction wood-flooring sample 15. Accordingly, the kit 10 can be comprised of multiple pre-construction wood-flooring samples 15 that cover a wide range of wood floor characteristics.

Also, to help match the reflectivity of the actual product, the pre-construction wood-flooring samples 15 may be manufactured from glossy paper having different coatings (e.g. aqueous coatings, UV coatings, varnishes, laminates, etc.) to dull the image and make it less reflective to natural light. Full aqueous coatings or full varnishes may dull the overall image to make its appearance closer to the actual product. Or, a spot coating of varnish on selected small areas of the pre-construction wood-flooring sample 15 may help to better replicate the light-reflective properties of the actual flooring product.

Each pre-construction wood-flooring sample 15 may include a label section 16 (about 2 inches in width) that permits the placement of information about the type and characteristics of the pre-construction sample (e.g. the wood floor of a specific manufacturer to which the sample 15 corresponds). The label section 15 has an area that is substantially smaller than the product image (e.g., the label section 16 occupies less than 10% of the overall area) on the pre-construction wood-flooring sample 15 because it is the large size of the product image that permits the consumer to visualize the actual product. As discussed below, the consumer may order the kit 10 via the internet. If so, local retail outlets that carry the wood floor of that specific manufacturer may be placed on the label section 16 based on the shipping address of the consumer. The label 16 may also contain a close-wood-sample section 17 which provides the names and images of different wood-flooring samples 15 that are similar, in some regard, to the characteristics to that particular sample 15 (which may or may not be a part of the kit 10).

Figure 2:
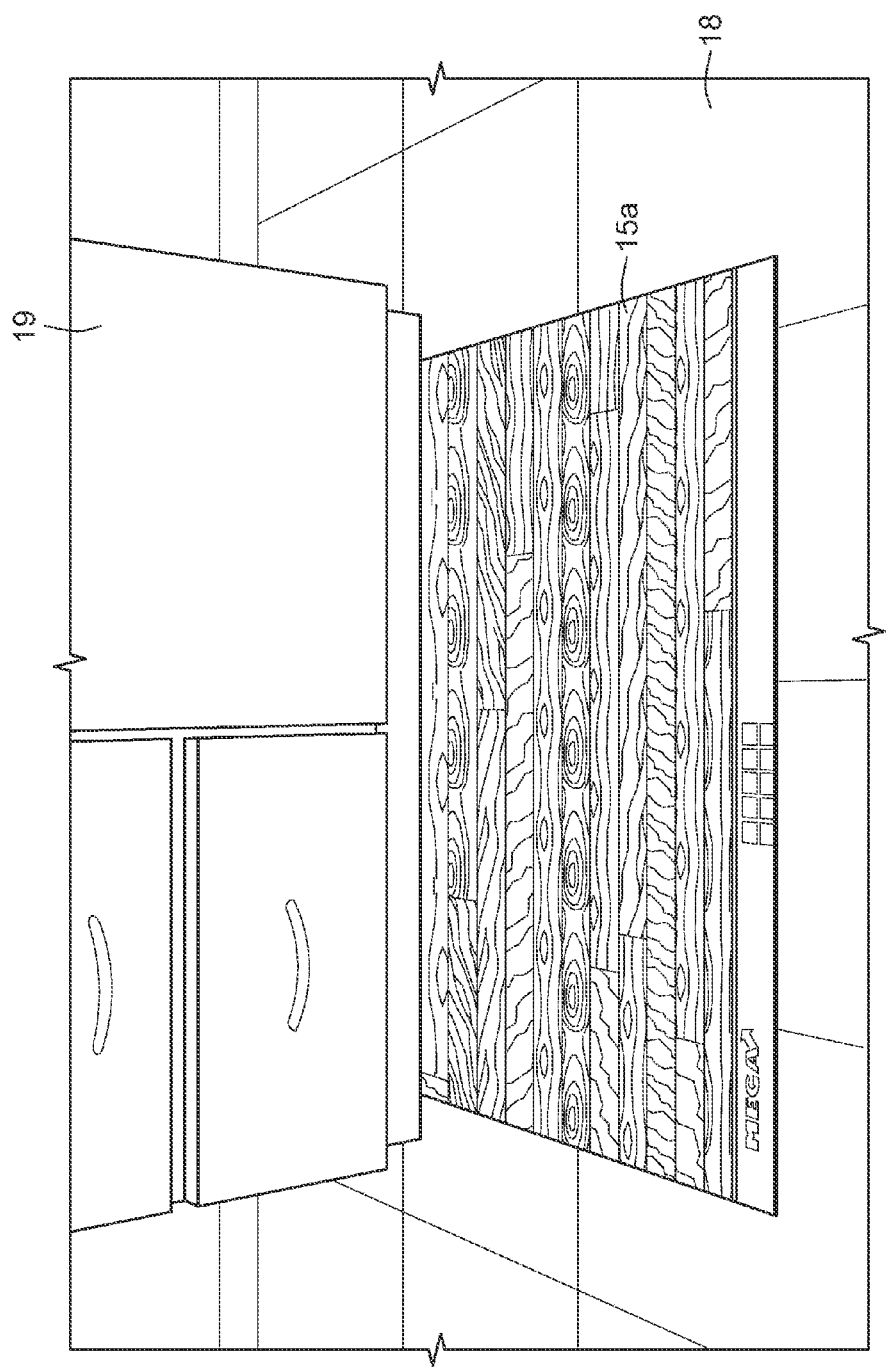
FIG. 2 illustrates one of the pre-construction flooring samples of FIG. 1 in use at a consumer's home.

FIG. 2 illustrates the first pre-construction wood-flooring sample 15a placed on the consumer's existing tile or vinyl floor 18 adjacent to an existing cabinet 19. As can be seen, the pre-construction wood-flooring sample 15a has dimensions that are larger than the width of the cabinet door. In use, the consumer would repetitively place each of the different pre-construction wood-flooring samples 15 at generally the same location on the existing floor 18 to evaluate how well each sample 15 looks relative to the existing cabinet 19. The consumer may also elect to tape each wood-flooring sample 15 to the existing floor 18 or align the samples 15 adjacent to each other to determine which one looks best in a side-by-side comparison. By using the various pre-construction wood-flooring samples 15 within the kit 10, the consumer can make a well informed decision of a wood floor that is best suited for that consumer's particular situation.

In one preferred embodiment, each of the pre-construction wood-flooring samples 15 corresponds to a particular known wood floor product that is made by a manufacturer (or manufacturers) and is labeled accordingly. This permits a one-to-one correlation between the particular pre-construction wood-flooring sample 15 and the corresponding wood floor product. Alternatively, each of the pre-construction wood-floor samples 15 may correspond to several similar wood floor products that are made by one or more manufacturers. Consequently, once the consumer has made a selection of a particular pre-construction wood-flooring sample 15, he or she can then purchase the corresponding wood floor product, or a wood floor product similar to the desired pre-construction wood-flooring sample 15. Taking the samples 15 to a flooring store to pick wood having the exact or similar characteristics is very easy.

FIG. 3 illustrates the kit 10 of FIG. 1 placed in a tubular package 25 for shipment and delivery purposes. Each of the pre-construction wood-flooring samples 15 is rolled such that the wood-flooring image is on the outward side of the roll. Thus, when the consumer opens the package 25 and removes the pre-construction samples 15, each of the pre-construction samples 15, if it has any bending due to being rolled, will bend downwardly toward the consumers existing floor. Other types of pre-construction product samples can be similarly packaged.

FIG. 4 illustrates a kit 40 of different pre-construction cabinet samples 45. Each of the different pre-construction cabinet samples 45 within the kit 40 has at least one different characteristic than the remaining cabinet samples 45 to permit a consumer to visualize different types of cabinets. For example, the different characteristics of the cabinet samples 45 may relate to the type of wood, the tone of the wood, the style of the cabinet (e.g., the shape of the inset 47 show in sample 45a), and/or the hardware (handles and hinges) used with the cabinet. While the label section 48 is shown at the bottom, it could also be located at the side as well.

The pre-construction cabinet samples 45 are preferably a large scale print having a size greater than typical cabinet sizes (greater than 18 inches). The cabinet samples 45 are printed from a high quality photograph, which has been sized such that the cabinet doors on the pre-construction cabinet sample 45 are roughly the same size as the cabinet doors in an actual cabinet product. In other words, the pre-construction cabinet samples 45 are preferably of a scale that is substantially a 1:1 scale with the actual cabinet doors that the consumer would purchase with the cabinetry. As such, in one preferred embodiment, each of the pre-construction cabinet samples 45 has a size dimension of at least roughly 2 feet (or larger) in one direction to provide for an appropriately sized cabinet image. For example, the pre-construction cabinet sample 45 may include an image of the cabinet door that is roughly 24-30 inches (e.g. 25 inches) in height for locating it over existing cabinetry under a kitchen sink or bathroom sink.

Alternatively, the pre-construction cabinet sample 45 may include an image of a drawer (e.g. 5 inch drawer) and an image of a cabinet (e.g. 22 inch cabinet), which is located directly below the drawer image, as would be seen in most typical kitchens. Such a pre-construction cabinet sample 45 may include a dashed line (or other indicia) adjacent its upper end indicating where the pre-construction cabinet sample 45 can be folded to fit into the top of the existing drawer in the consumer's home (e.g., see pre-construction cabinet sample 230 in FIG. 18). In this situation, the label section 48 can be on the portion of the construction cabinet sample 45 above the dashed line such that the label section 48 is the part that is folded into the existing drawer when the pre-construction cabinet sample 45 is draped over the consumer's existing cabinets. In addition or in the alternative to the dashed lines for the fold, the pre-construction cabinet sample 45 may include cut-lines to show the consumer the location of two cuts that can be made on either side of the pre-construction cabinet sample 45. Cutting slits along the cut-lines helps the folded section fit within the consumer's existing drawer such that the drawer can be closed easily to help support the pre-construction cabinet sample 45 as the consumer evaluates the sample. In other words, the slits help to create a secondary fold within the folded section, making that portion of the pre-construction cabinet sample 45 smaller in area such that it fits into the drawer. The cut-lines may be in the vertical or horizontal direction, as long as they permit the secondary fold to decrease the overall area of the folded section of the pre-construction cabinet sample 45 within the drawer. Alternatively, perforations can be used instead of cut-lines so that the consumer can simply tear the pre-construction cabinet sample 45 to the correct length for folding.

Alternatively, the pre-construction cabinet samples 45 may include a wall-mounted, above-the-counter cabinet having a height of 42 inches. It should be noted that the label section 48 for each cabinet sample 45, which is shown in FIG. 4 at the bottom, can be located on the side (as mentioned above) or not included at all.

Also, to help match the reflectivity of the actual cabinet product, the pre-construction cabinet samples 45 may be manufactured from glossy paper having different coatings (e.g. aqueous coatings, UV coatings, varnishes, laminates, etc.) to dull the image and make it less reflective to natural light. Full aqueous coatings or full varnishes may dull the overall image to make its appearance closer to the actual product. Or, a spot coating of varnish on selected small areas of the pre-construction sample 45 may help to better replicate the light-reflective properties of the actual product.

Figure 5:
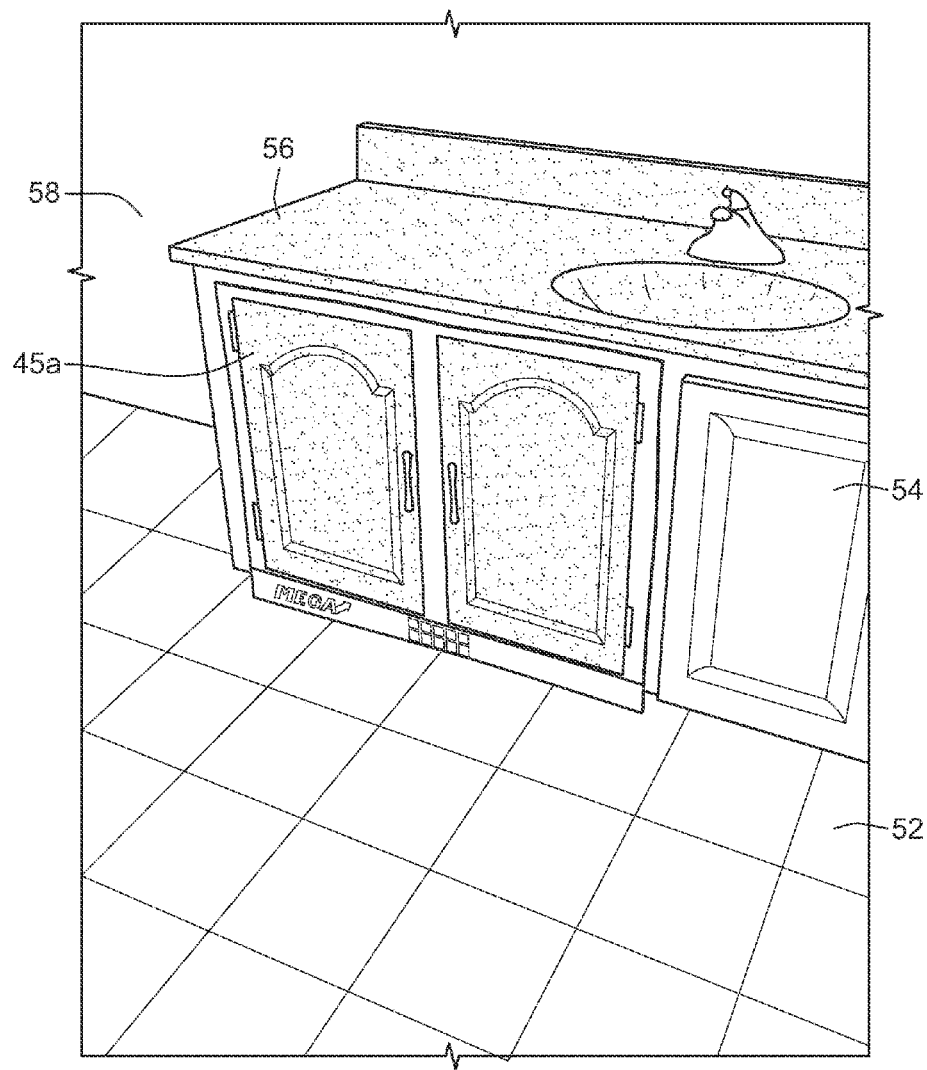
FIG. 5 illustrates one of the pre-construction cabinet samples of FIG. 4 in use at a consumer's home.

FIG. 5 illustrates the use of a pre-construction cabinet sample 45 in FIG. 4 in the consumer's home. Specifically, the consumer has placed the pre-construction cabinet sample 45a over an existing cabinet surface 54. Because the pre-construction cabinet sample 45a is on a high-quality image, the consumer is provided with a very close replication of how an actual cabinet corresponding to the pre-construction sample 45a would look relative to the existing floor 52, the existing countertop 56, and the existing wall 58. In summary, by using the various cabinet samples 45 within the kit 40, the consumer is able to visualize how various actual cabinets will look relative to existing structures within the consumer's home. Accordingly, the consumer has an easier time making a decision for the best cabinet product that will suit his or her particular needs.

Figure 6:
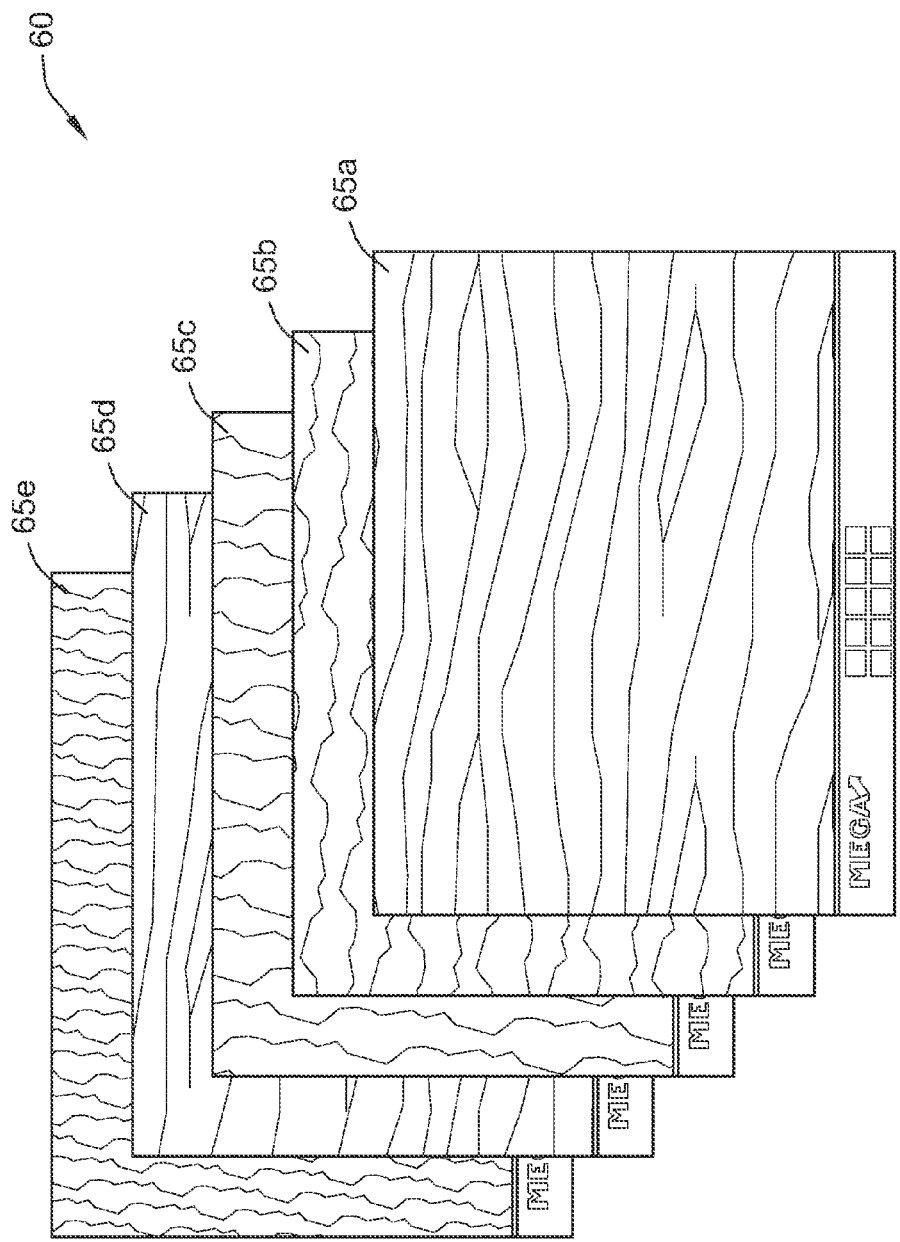
FIG. 6 illustrates a kit of different pre-construction countertop samples.

FIG. 6 illustrates a kit 60 of different pre-construction countertop samples 65 (e.g., laminate or granite). Each of the different pre-construction countertop samples 65 within the kit 60 has at least one different characteristic than the remaining pre-construction cabinet samples 65 to permit a consumer to visualize different types of countertops. For example, the different characteristics of the countertop samples 65 may relate to the type of countertop (e.g., man-made stone, natural stone, granite, laminate), the design of the patterns or irregularities in theses types of countertops, and the colors in these types of countertops.

The pre-construction countertop samples 65 are preferably a large-scale print having a size that is at least approximately the same depth as a normal countertop (e.g. 26 inches). The pre-construction countertop samples 65 are printed from a high-quality image, which has been sized such that various patterns or irregularities within the surface of the actual countertop are approximately the same size as the patterns or irregularities along the pre-construction countertop sample 65. In other words, the pre-construction countertop samples 65 are preferably of a scale that is substantially a 1:1 scale with the patterns or irregularities of the actual countertop that the consumer would purchase. Accordingly, when the pre-construction countertop samples 65 is fit over the consumer's existing countertop, it appears to the consumer as though his or her existing countertop has been modified to the material and appearance corresponding to the pre-construction countertop sample 65.

Regarding man-made countertops (e.g. Silestone, and other similar products), there is oftentimes a fairly consistent pattern in the irregularities of the countertop. Thus, using a single photograph of the man-made countertops and repeating the image can be enough to create a pre-construction man-made countertop sample 65 in which the size of the irregularities (e.g., quartz) and scale of the irregularities are substantially the same as the actual product. On the other hand, developing a pre-construction natural stone countertop sample 65 (e.g., replicating granite) can be a bit more challenging as the size of the irregularities and the patterns are unique. In such situations, it may be required to take multiple photographs of a single piece of stone (e.g. granite) and merge them together (e.g. via Photoshop) to form the pre-construction natural stone countertop sample 65. Although each piece of granite is slightly different, the pre-construction natural stone countertop samples 65 are still able to provide the consumer with enough confidence that the type of corresponding to the pre-construction natural stone countertop sample 65 (or kit thereof) will be acceptable in the consumer's home. Furthermore, to help match the reflectivity of the actual product, the pre-construction countertop samples may be manufactured from glossy paper having different coatings (e.g. aqueous coatings, UV coatings, varnishes, laminates, etc.) to dull the product and make it less reflective to natural light. Full aqueous coatings or full varnishes may dull the overall image to make its appearance closer to the actual product. Or, a spot coating of varnish on selected small areas of the pre-construction countertop sample 65 may help to better replicate the light-reflective properties of the actual countertop. On the other hand, dull papers can be the medium on which it is printed, and coatings may be added to make a glossier finish to the pre-construction natural countertop sample 65

Figure 7:
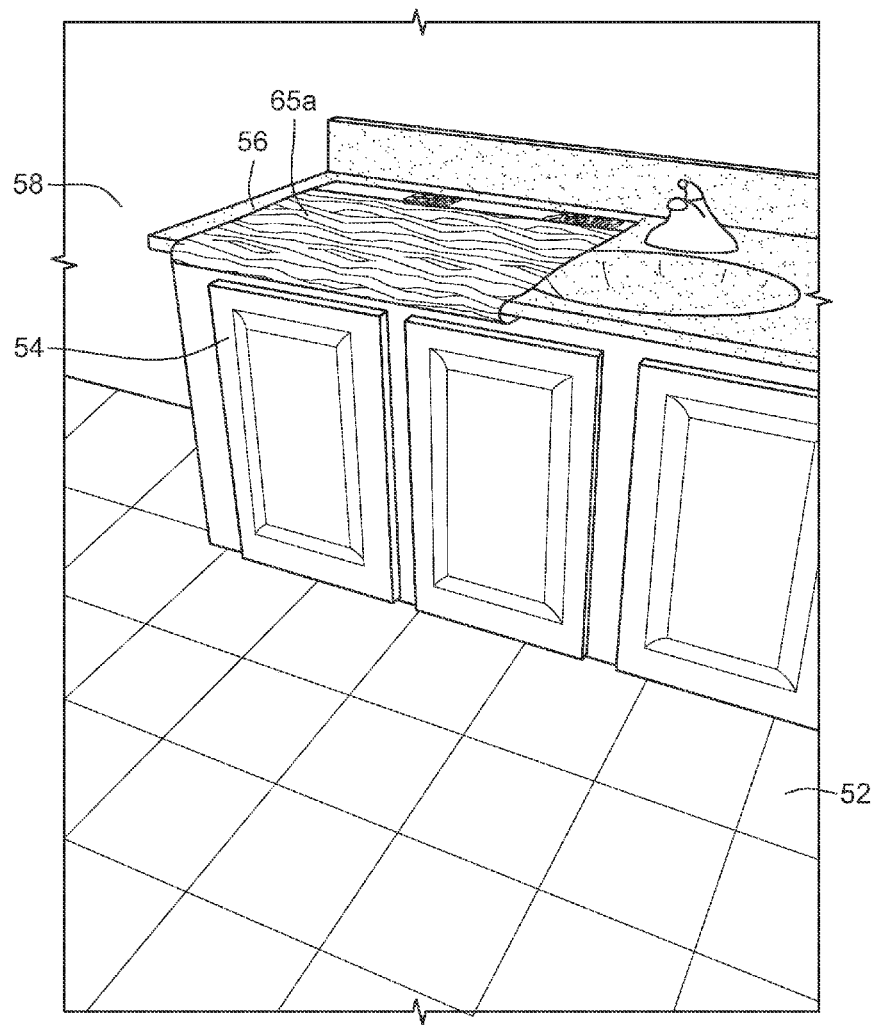
FIG. 7 illustrates one of the pre-construction countertop samples of FIG. 6 in use at a consumer's home.

FIG. 7 illustrates the use of the pre-construction countertop sample 65*a* in the consumer's home. Specifically, the consumer has placed the pre-construction countertop sample 65*a* over the existing countertop 56. Because the pre-construction countertop sample 65*a* is of a high-quality image, the consumer is provided with a very close replication of how an actual countertop corresponding to the pre-construction sample 65*a* would look relative to the existing floor 52, the existing cabinet 54, and the existing wall 58. In summary, by using the various pre-construction countertop samples 65 within the kit 60, the consumer is able to visualize how various actual countertops will look relative to existing structures within the consumer's home. Accordingly, the consumer has an easier time making a decision for the best countertop product that will suit his or her particular needs.

Figure 8:
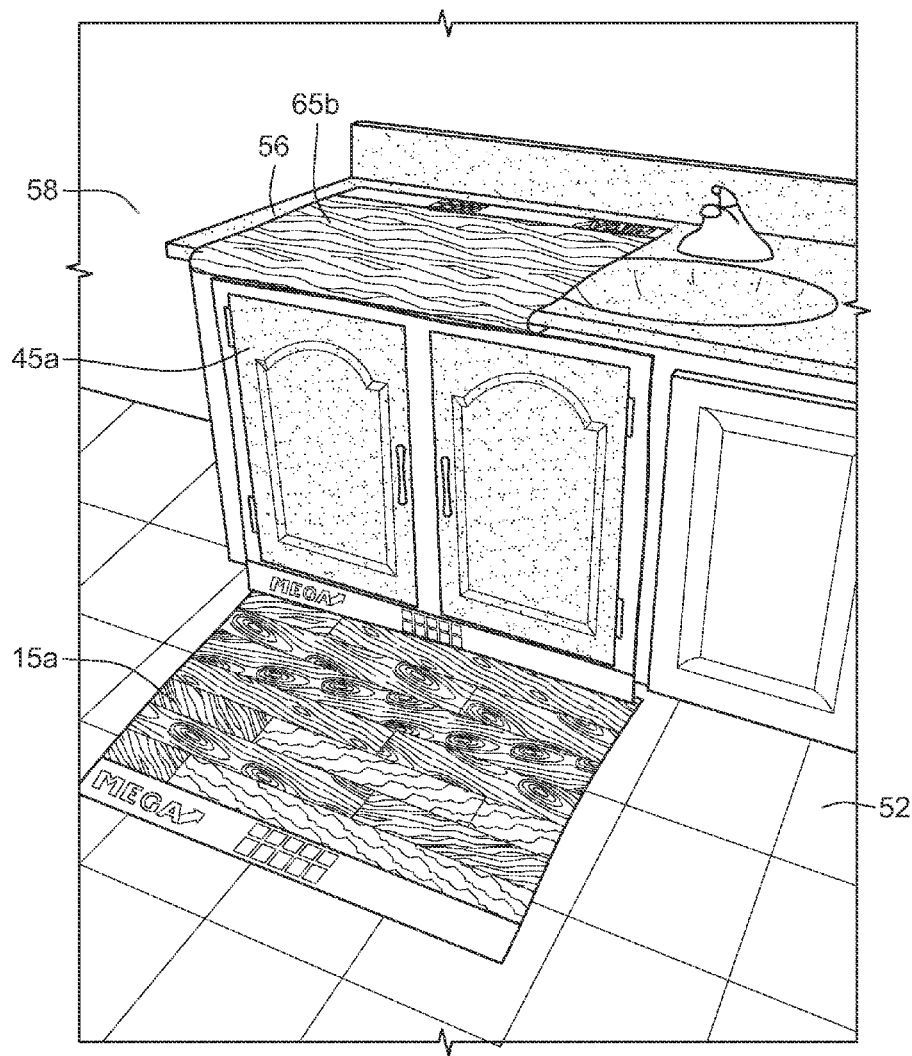
FIG. 8 illustrates one of the pre-construction countertop samples of FIG. 6, one of the pre-construction cabinet samples of FIG. 4, and one of the pre-construction flooring samples of FIG. 1 in use in combination at a consumer's home.

FIG. 8 illustrates the use of the combination of the pre-construction wood floor sample 15*a* from the kit 10, the pre-construction cabinet sample 65*a* of the kit 40, and the pre-construction countertop sample 65*b* of the kit 60. In other words, FIG. 8 is illustrating the consumer's ability to use multiple types of pre-construction samples 15, 45, and/or 65 to determine what will look best in the consumer's home. As such, the present invention contemplates the use of multiple kits 10, 40, 60 in combination with each other. Alternatively, the present invention contemplates the use of a single kit which contains samples of multiple pre-construction product samples (e.g., samples of flooring, cabinets, and/or countertops) and multiple selections within each pre-construction product sample type.

Furthermore, as discussed in more detail below, the present invention also contemplates the use of a custom kit, the contents of which have been selected by a consumer. In other words, the consumer may select specific pre-construction samples of flooring, specific pre-construction samples of countertops, and/or specific pre-construction samples of cabinets which then form a single kit the permits the consumer to make a final selection of construction products to best suit his or her needs of that particular consumer. Or, the custom kit may simply contain multiple specific pre-construction samples of a single construction product (e.g., the kit contains four samples of different pre-construction wood flooring). The consumer can create such a custom kit by accessing a certain website for purchasing the custom kit to be delivered to the consumer (as discussed in more detail below). Or, the consumer can create such a custom kit by selecting from among various pre-construction samples that are present at a retail outlet (e.g., selection from among multiple bins of different pre-construction wood-flooring samples 15 at a flooring store, a hardware store, or a construction store).

Figure 9:
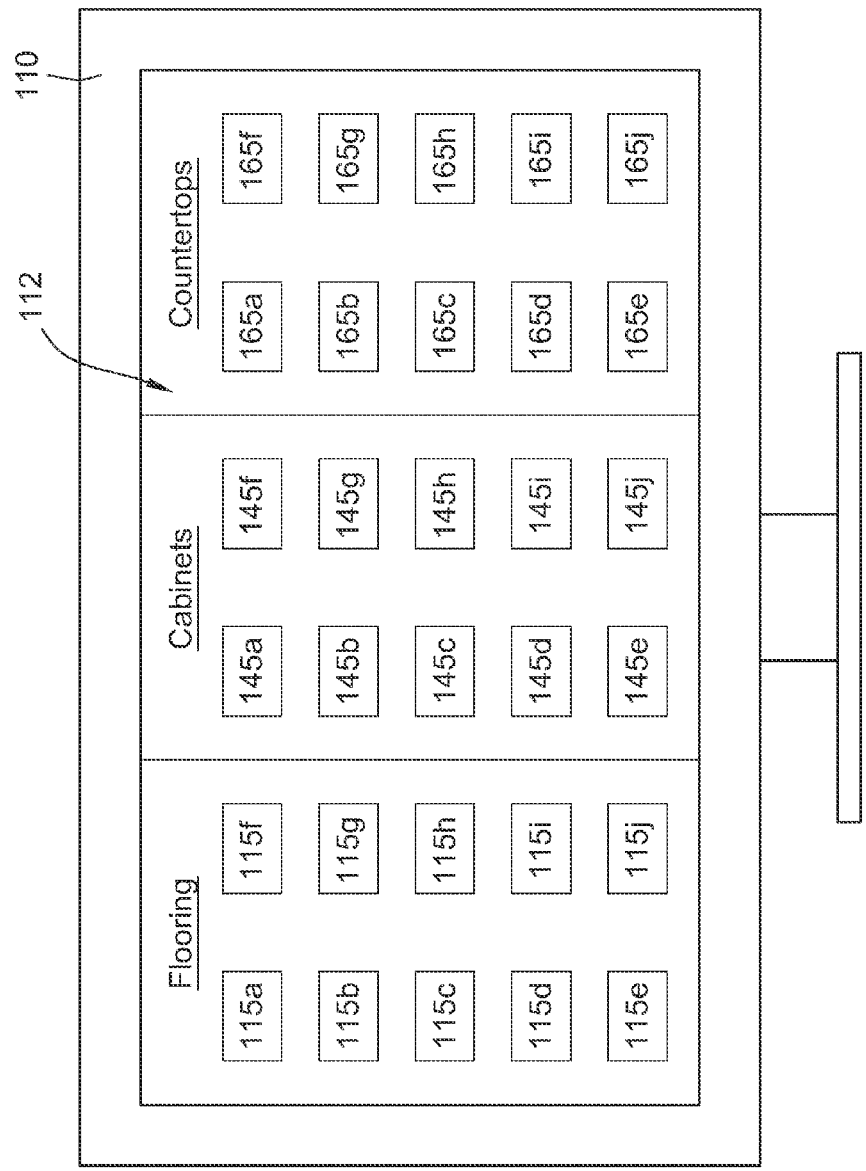
FIG. 9 illustrates a computer display screen in which multiple types of pre-construction samples are available for selection by the consumer.

FIG. 9 illustrates a computer display 110 that can be used by the consumer (e.g. the consumer's personal computer) to develop a custom kit of pre-construction samples. Alternatively, the computer can be located at a retail store that sells construction products (e.g., flooring, cabinets, and countertops) which permits the consumer to develop a custom kit of pre-construction samples at the retail location after the consumer understands the variety of construction products available to him or her.

The computer display 110 has access to a certain publicly accessible website, which has a web page (or web pages) 112 that provides for a variety of different pre-construction product samples. Typically, each of those different types of pre-construction product samples would be arranged together for viewing and selection by the consumer. As shown, the web page 112 on the website has three sections for displaying options for three different pre-construction product samples—flooring, cabinets, and countertops. The consumer is able to select any of the icons 115*a*-115*j* under the flooring section and view a larger scale version of a certain type of flooring sample. For example, the icons 115*a*-115*e* correspond to the pre-construction wood-flooring samples 15*a*-15*e*, which are shown in FIG. 1. Thus, the consumer is able to create a custom kit comprised of multiple pre-construction wood-flooring samples 15 corresponding to the selected icons 115*a*-115*j*.

The consumer is also able to select any of the icons 145*a*-145*j* under the cabinet section and view a larger scale version of a certain type of cabinet sample. For example, the icons 145*a*-145*e* correspond to pre-construction cabinet samples 45*a*-45*e*, which are shown in FIG. 4. The consumer is able to create a custom kit comprised of multiple pre-construction cabinet samples 45 corresponding to the selected icons 145*a*-145*j*. The computer display 110 and icons of FIG. 9 can also be adapted for use with various types of pre-construction samples, including those discussed below with reference to FIGS. 11-18.

Similarly, the consumer is able to select any of the icons 165*a*-165*j* under the countertop section and view a larger scale version of a certain type of countertop sample. For example, the icons 165*a*-165*e* correspond to pre-construction cabinet samples 65*a*-65*e*, which are shown in FIG. 6. Thus, the consumer is able to create a custom kit comprised of multiple pre-construction countertop samples 65 corresponding to the selected icons 165*a*-165*j*.

Figure 10:
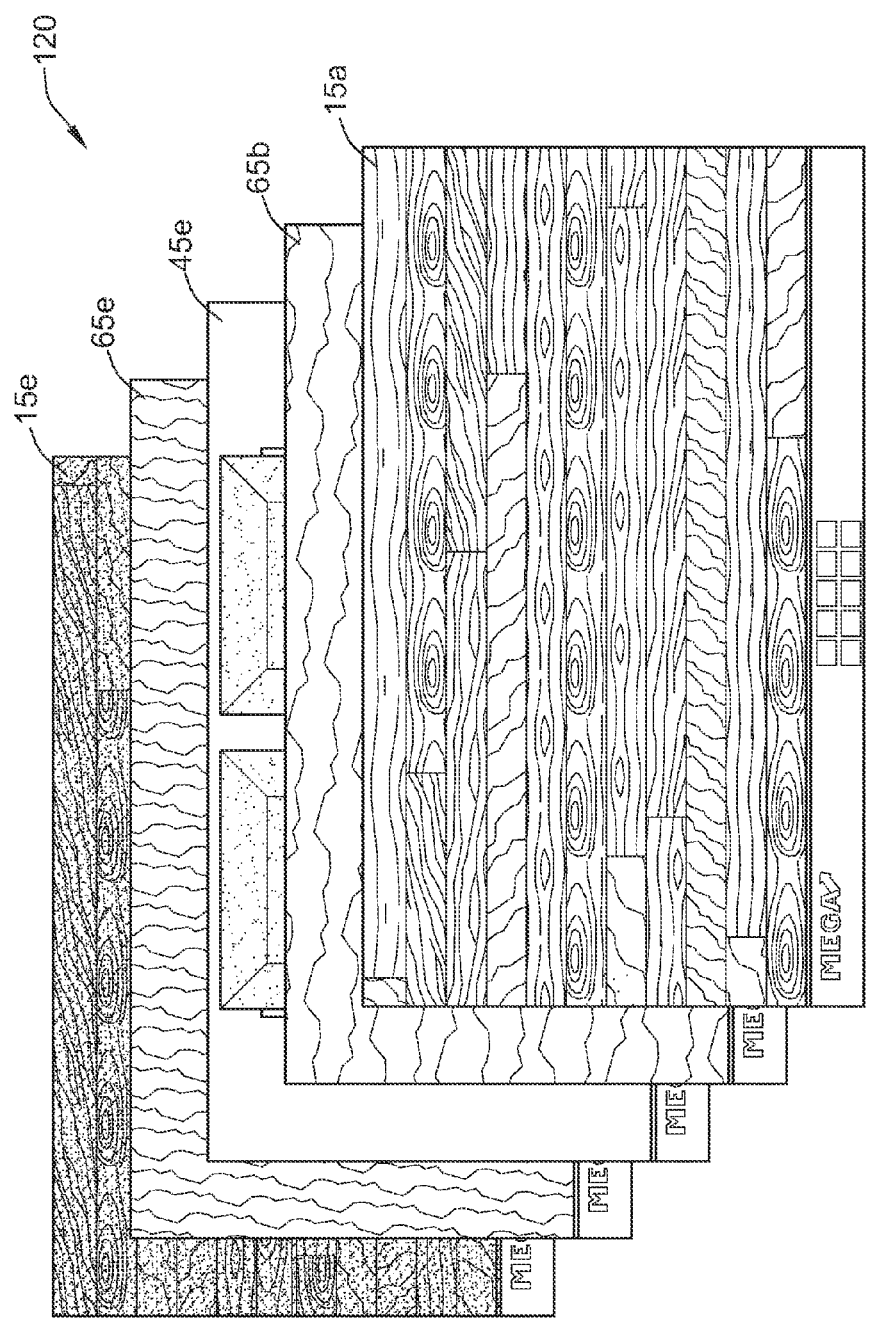
FIG. 10 illustrates a kit comprised of different pre-construction countertop samples, different pre-construction flooring samples, and different pre-construction cabinet samples.

After the person has made his or her selection (which may require a purchase of the pre-construction samples), the custom kit of pre-construction wood-flooring samples 15, pre-construction cabinet samples 45, and/or pre-construction countertop samples 65 that was developed by the consumer would be delivered to the consumer for use in his or her home, as described above. For example, FIG. 10 illustrates a custom kit 120 that includes two pre-construction flooring samples 15*a* and 15*e*, a single pre-construction cabinet sample 45*e*, and two pre-construction countertop samples 65*b* and 65*e*.

Figure 11:
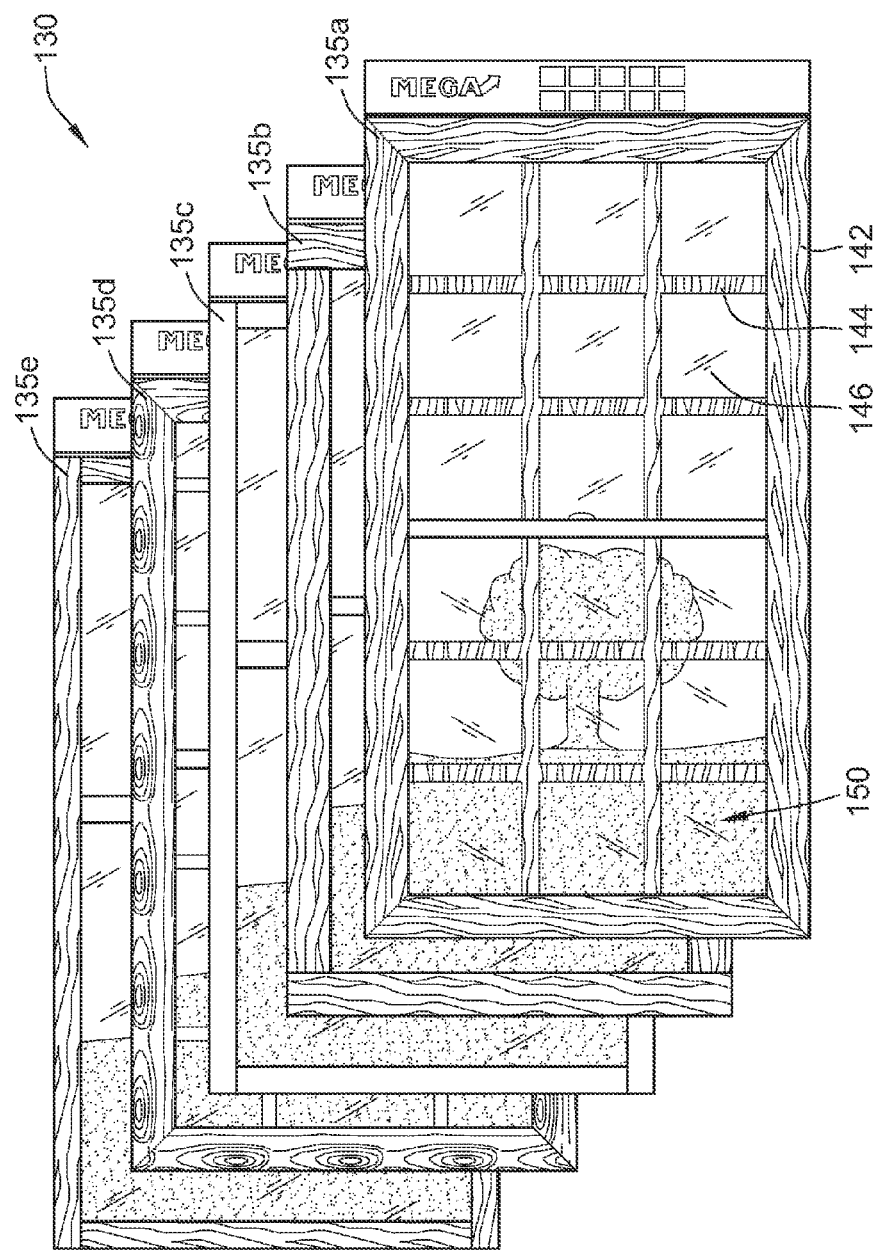
FIG. 11 illustrates a kit of different pre-construction window samples.

FIG. 11 illustrates a kit 130 of different pre-construction window samples 135. Each of the different pre-construction window samples 135 within the kit 130 has at least one different characteristic than the remaining pre-construction window samples 135 to permit a consumer to visualize different types of windows. For example, the different characteristics of the window samples 135 may relate to the type and color of the window frames 142 (e.g., wood, polymeric, or metal), the design of the muntins 144 that define the panes 146, and/or the type of hardware/latches in the window. The muntins 144 can be of different styles, such as horizontal and vertical muntins 144 that create rectangular panes, angled muntins 144 to create diamond shape panes, or no muntins at all. Preferably, each of the pre-construction window samples 135 includes an outdoor image 150 to provide an exemplary outdoor scene.

The pre-construction window samples 135 are preferably a large-scale print having a size that is at least approximately the same size as a normal window (e.g. at least 18 inches in both dimensions, and preferably at least about 2 feet to 3 feet, or larger). The pre-construction window samples 135 are printed from a high-quality image, which has been sized such that the frame 152, the muntins 144, and the panes 146 are approximately the same size as the actual window being replicated. In other words, the pre-construction window samples 135 are preferably of a scale that is substantially a 1:1 scale with the actual window that the consumer would purchase. Accordingly, when the pre-construction window sample 135 is placed on a wall (possible over the consumer's existing window), it appears to the consumer as though a window has been added to the wall with an appearance corresponding to the pre-construction window sample 135.

Figure 12:
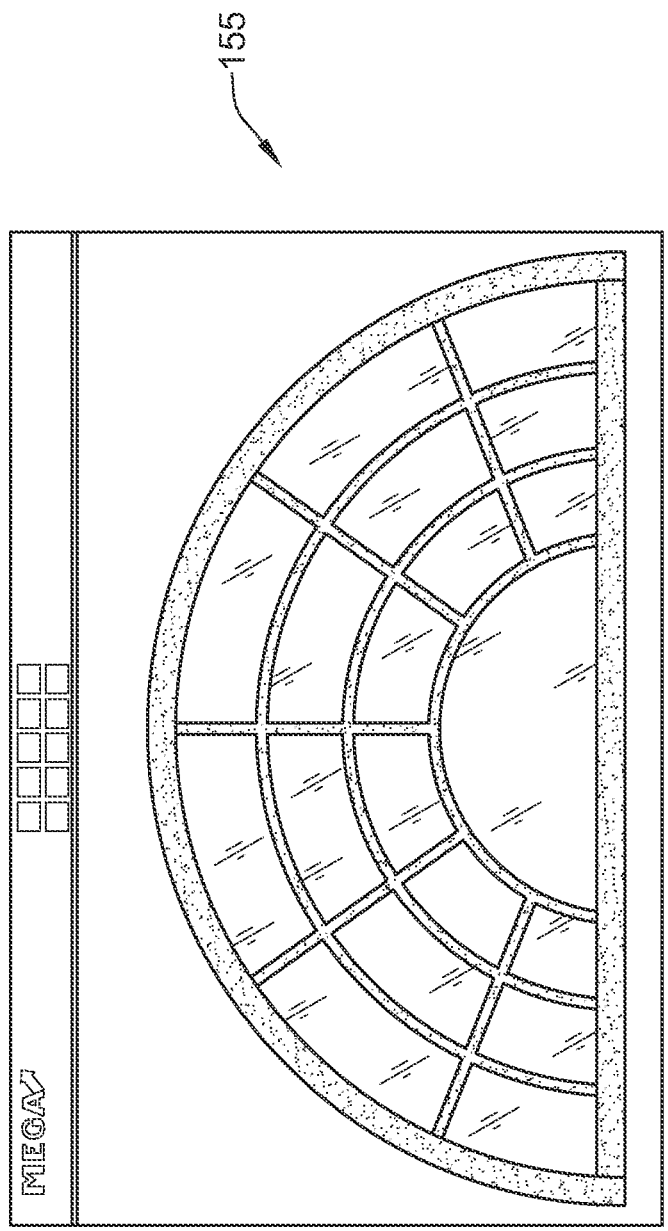
FIG. 12 illustrates a pre-construction window sample with a different shape.
Figure 13:
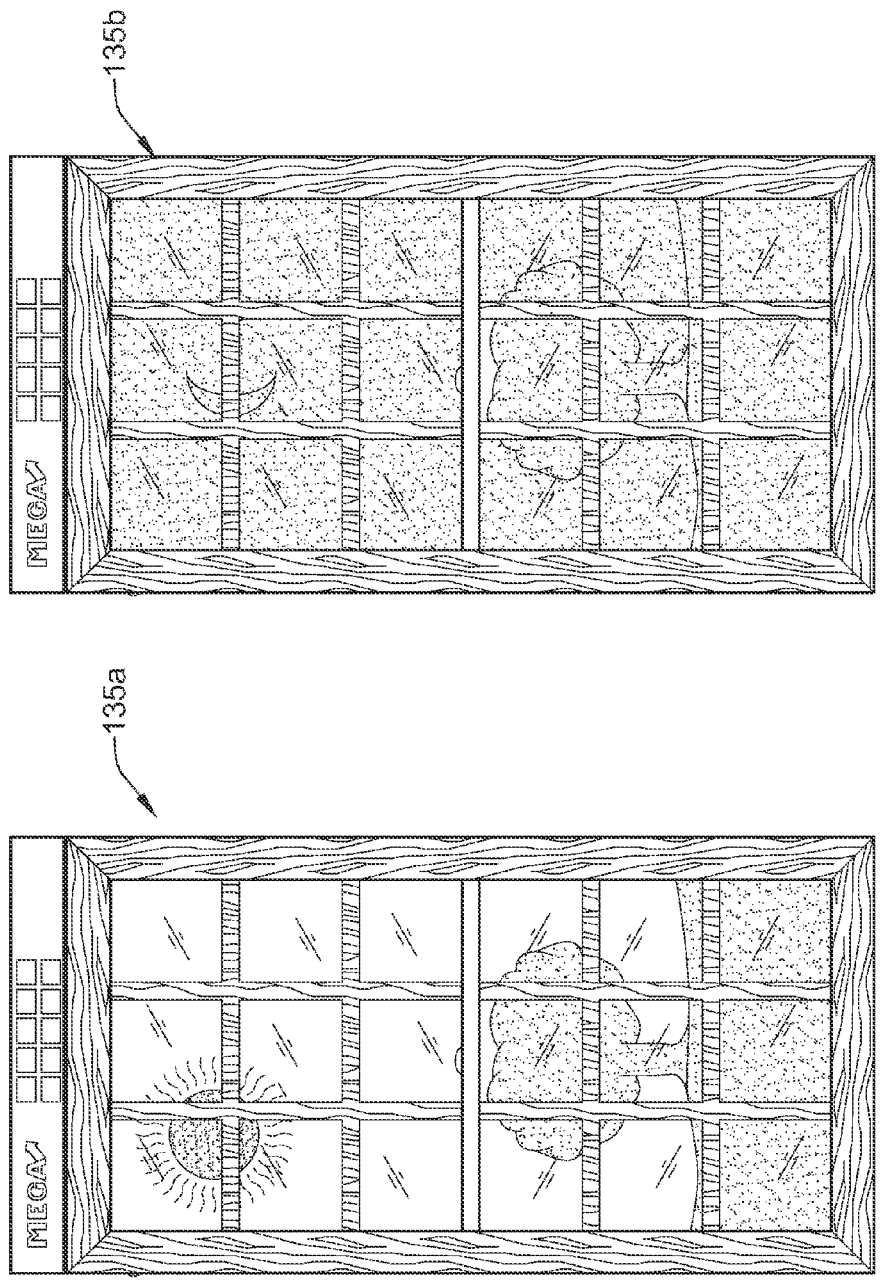
FIGS. 13A and 13B illustrate pre-construction window samples printed on both sides of the same piece of flexible material.

The pre-construction window samples 135 does not need to be of a rectangular shape. For example, FIG. 12 illustrates a half-round pre-construction window sample 155 that replicates an existing half-round window that the consumer may purchase. The pre-construction window sample 155 may include lines of perforation at which the consumer may cut the sample 155, such as along the rounded frame. Other shapes, such as full-round windows and hexagonal or octagonal windows, are available for the window samples. It should be understood that the window samples can have the same shape as the shape of the window being replicated.

It should be noted that the pre-construction window samples 135 and 155 could include perforations and/or slits along the window panes 156 to provide for easy removal of the panes 156. Thus, the window sample 135, 155 could be placed over an existing window so that the consumer gets a feel for the actual view outside of the window, as well as a feel for the structure of the window.

FIGS. 13A and 13B illustrate a single piece of flexible material in which a first window sample 135a is placed on one side and a second window sample 135b is placed on the opposite side of the same piece of material. Additionally, the second window sample 135b includes images of a night scene (as opposed to a day scene) as the actual window may look a bit different with a dark background (such as in night) than with a lighted background (such as in daytime). Other types of preconstruction samples can also be printed on both sides as well.

Figure 14:
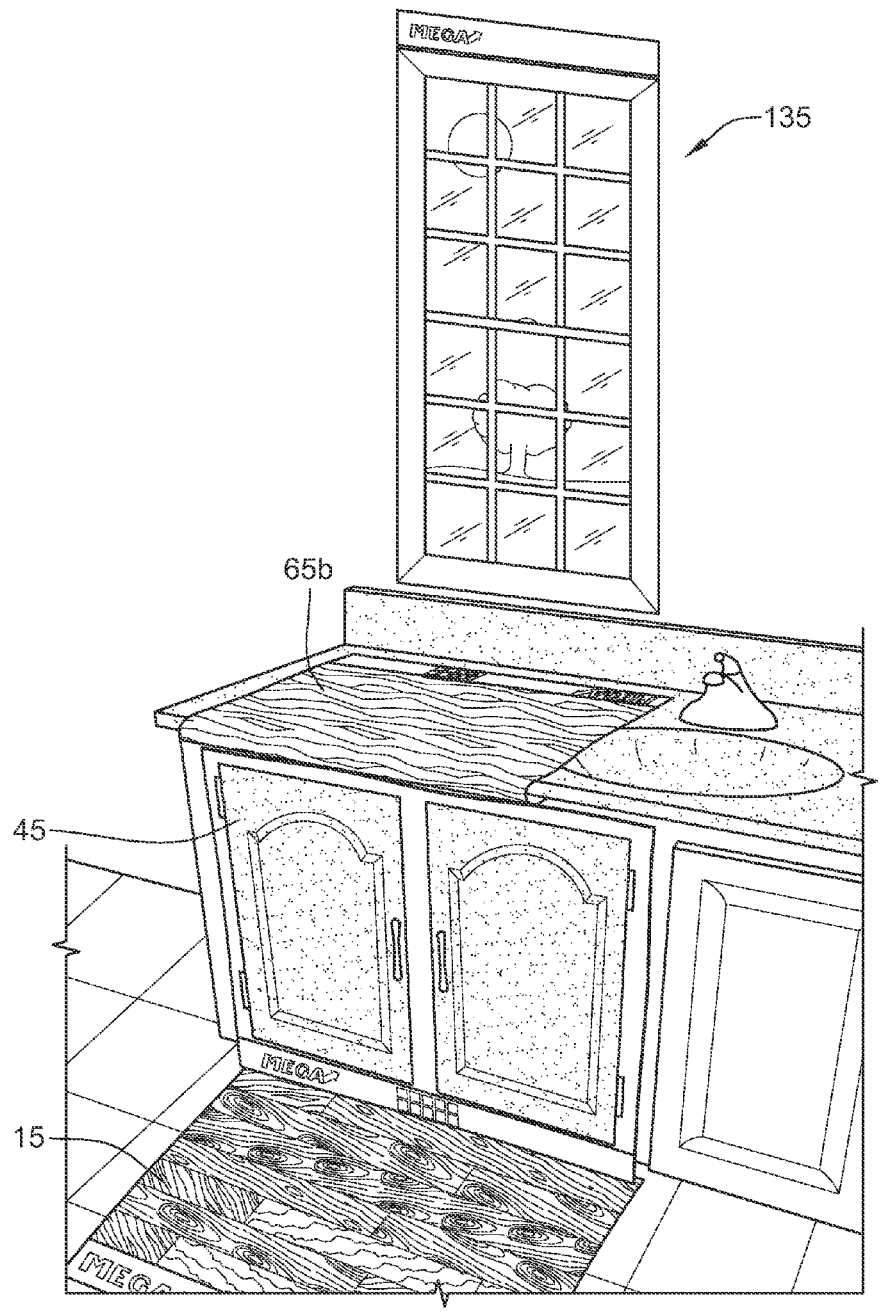
FIG. 14 illustrates one of the pre-construction window samples of FIG. 11 in use at a consumer's home.

FIG. 14 illustrates the pre-construction window sample 135 placed on a wall to determine who a certain window would look in the consumer's residence. As shown, the pre-construction window sample 135 can also be used with other pre-construction samples 15, 45, 65 to help the consumer visualize the end-result of a large scale renovation.

Figure 15:
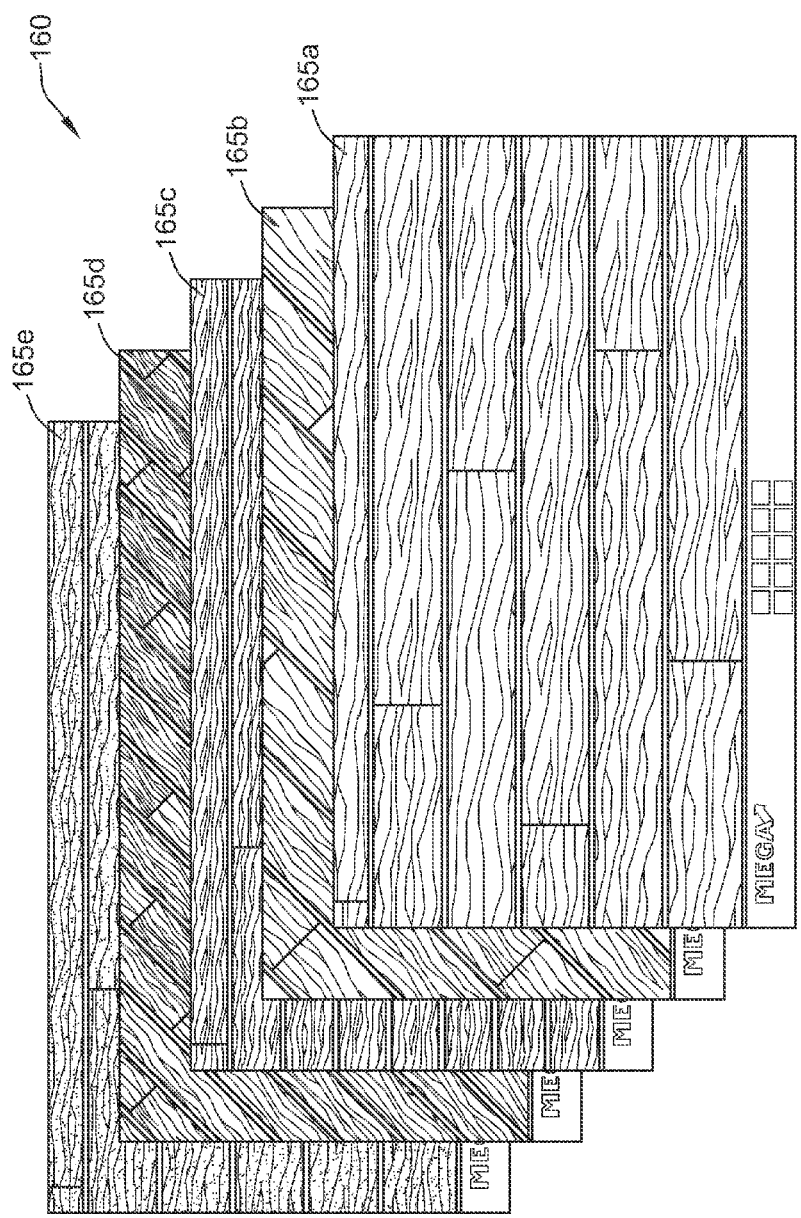
FIG. 15 illustrates a kit of different pre-construction decking samples.

FIG. 15 illustrates a kit 160 of different pre-construction decking samples 165. Each of the different pre-construction decking samples 165 within the kit 160 has at least one different characteristic than the remaining pre-construction decking samples 135 to permit a consumer to visualize different types of decking for an exterior deck. For example, the different characteristics of the decking samples 165 may relate to the type (e.g., wood decking, composite decking, etc) and the color of the decking, the plank width for the decking, the plank angle of the decking, among others.

The image on the pre-construction decking samples 165 is sized such that the planks on each sample 165 are of a size that is substantially the same as the size of the actual deck planks that a consumer would purchase (e.g. 4 inch planks). In other words, the pre-construction decking samples 165 are preferably of a scale that is substantially a 1:1 scale with the actual decking that the consumer would purchase.

Figure 16:
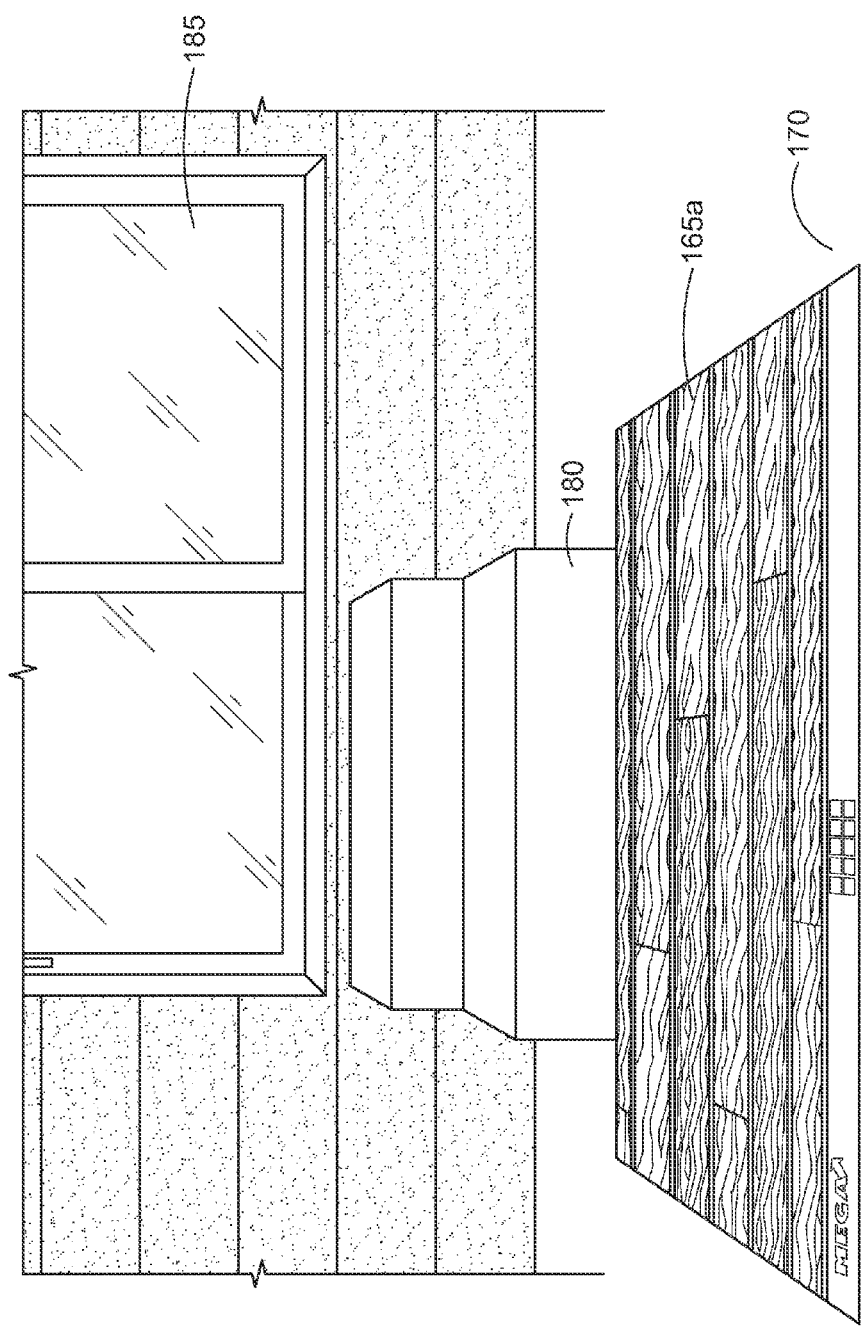
FIG. 16 illustrates one of the pre-construction decking samples of FIG. 15 in use at a consumer's home.

FIG. 16 illustrates one of the pre-construction decking samples 165a in use with the consumer. The consumer has placed the pre-construction decking sample 165a on the existing deck 170 adjacent to the steps 180 near a sliding glass door 185. If the consumer has an entire kit 160 of samples 165, he or she can remove and replace the samples 165a, 165b, 165c, 165d, and 165e to determine which one is more suitable for that consumer's deck. Accordingly, the consumer may have an easier time choosing the actual decking product for his or her deck.

Figure 17:
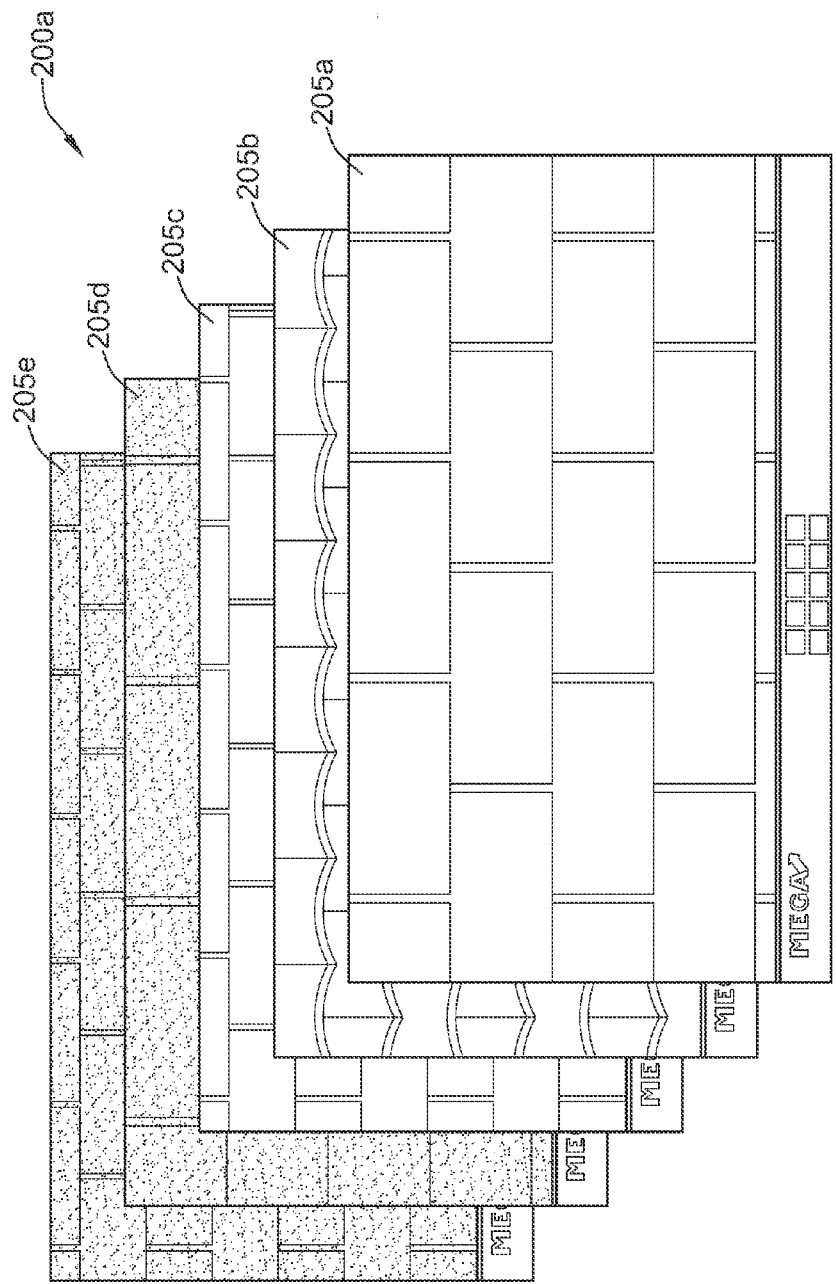
FIG. 17 illustrates a kit of different pre-construction roofing samples.

FIG. 17 illustrates a kit 200 of different pre-construction roofing samples 205. Each of the different pre-construction roofing samples 205a-205e within the kit 200 has at least one different characteristic than the other pre-construction roofing samples 205 to permit a consumer to visualize different types of shingles for his or her house. For example, the different characteristics of the roofing samples 205 may relate to the type of shingle (e.g., ceramic, tile, asphalt, metal, wood, etc), the shapes of the shingles, and the colors available for the shingles.

The image on the pre-construction roofing samples 205 is sized such that the shingles on each sample 205 are of a size that is substantially the same as the size of the actual shingles a consumer would purchase. In other words, the pre-construction roofing samples 205 are preferably of a scale that is substantially a 1:1 scale with the actual shingles that the consumer would purchase.

Figure 18:
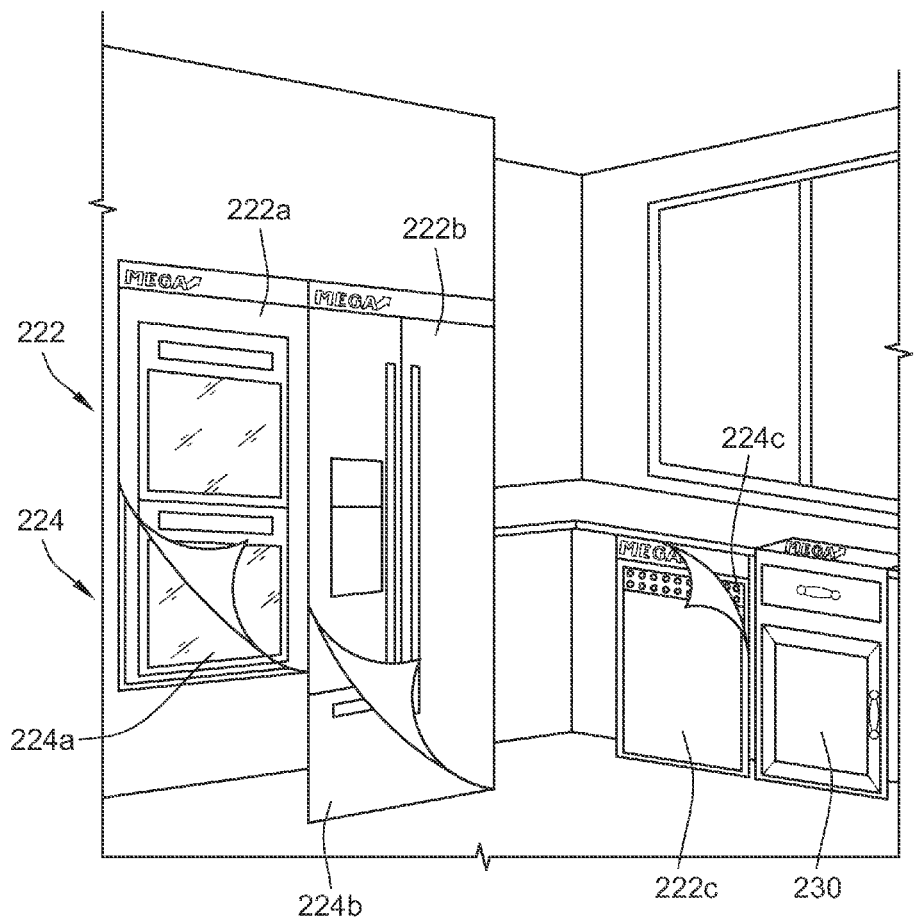
FIG. 18 illustrates multiple kits of different pre-construction appliance samples in use in a consumer's kitchen, and also a folded pre-construction cabinet sample.

FIG. 18 illustrates a kitchen with multiple kits 222, 224 of different pre-construction appliance samples. Each kit 222, 224 may include various members of a certain type of appliance that are often grouped together and purchased by a consumer as one set. For example, a first kit 222 may includes an oven sample 222a, a refrigerator sample 222b, and a dishwasher sample 222c. A second kit 224 may include an oven sample 224a, a refrigerator sample 224b, and a dishwasher sample 224c. The kits 222, 224 may include more or less appliances. Each kit 222, 224 may be different from other kits by the color of the appliances, the style of the appliances (e.g. side-by-side refrigerator, or top-bottom refrigerators), or the manufacturer of the appliances. Preferably, the appliance samples are approximately the same size as the actual appliances and would fit over the consumer's existing appliances to allow the consumer to make a selection of an appliance set (e.g., black or stainless steel) looks best in his or her kitchen.

FIG. 18 also illustrates a pre-construction cabinet sample 230 having its header on the short end of the sample. The pre-construction cabinet sample 230 includes an image of a combination of a cabinet and a drawer, as would be present in most kitchens. As previously described, the header has been folded and placed on the counter, and may be held there with tape or an adhesive pre-applied to the back of the sample 230. Or, it can be folded (and possibly cut along perforations or cut-lines) and placed in an existing drawer such that the closing of the drawer holds the pre-construction cabinet sample 230 in place.

Alternatively, a consumer may be shopping for only one appliance and a kit may include multiple pieces of one type of appliance. For example the kit may include multiple refrigerators.

As can be understood, the previous types of preconstruction samples (e.g., flooring, countertops, and cabinetry) may be used together with the appliance samples to provide even more visualization of kitchen design options. This type of selection can be especially useful in providing consumer's with assistance when building a new home in that a kitchen model in a model home can be "redone" to different kitchen styles by mixing and matching various appliance samples, floor samples, countertop samples, and cabinet samples. Alternatively, an actual kitchen may not be needed to remove and replace the samples. The kitchen model can simply be a wood or polymeric frame structure that is adapted to receive various appliance samples, floor samples, countertop samples, and cabinet samples, as described above, to provide a visualization of numerous combinations of these actual products.

It should be noted that the consumer may also be able to directly print smaller versions of each of those pre-construction samples at the consumer's home printer to create such a custom kit. In other words, while the pre-construction samples are preferably of a large size (e.g. at least 18 inches in each dimension) and made of high resolution, the invention contemplates the consumer's ability to print each one of the selected pre-construction samples at his or her own home. As common home printers are typically not configured for such large size paper (although it is surely possible for some consumers to do so), the consumer's ability to print at home may be limited to smaller versions of each pre-construction sample. While such sizes may not be able enough to facilitate the easy and large-scale display of the pre-construction sample (as shown in FIGS. 2, 5, 7, and 8), they are still larger than most commonly available samples. Consumer printing may be more conducive to pre-construction samples that are not required to be a certain size, such as flooring or countertop samples in which a certain area can be printed (i.e., it may be more difficult for consumers to print regular sized window samples, cabinet sample, or appliance samples since they may be larger than a typical home printer).

In a further alternative, if the computer display 110 of FIG. 9 is in a retail setting, the consumer may not need to access a website to produce a custom kit. Rather, the consumer can simply select from the same type of icons 115, 145, 165 on the webpage 112 and cause images (stored in a local memory) to be printed to a localized printer electronically coupled to be computer display 110. Thus, the selected pre-construction samples, like those shown in FIGS. 1-8, are immediately printed. In other words, the printing process would occur locally at the retail outlet permitting the consumer to quickly develop a custom kit. Unlike printing from home as described above, a retail setting may be more suited to have a large-scale printer to print the large pre-construction samples.

It is also possible to permit the consumer to select the samples to be printed from his or her home (via the website) and print them to a local retailer (e.g. a flooring store having a high-resolution printer). Thus, the samples can be immediately picked up by the consumer. This would avoid the delivery from a remote printing location associated with the website owner. In summary, there are various ways to produce a custom kit of large-scale, pre-construction samples in accordance to the present invention. The consumer can create his or her own custom kit by selecting from bins at a retail setting that contains numerous different pre-construction samples. The consumer can also create a custom kit by selecting from among various pre-construction samples from a website and having them delivered. In another alternative, the consumer can create a custom kit by selecting from among various pre-construction samples from a website and having them printed at a local outlet at which he or she can pick them up (or even printed to their own printer as described above). In yet a further alternative, the consumer can create a custom kit by selecting from among various pre-construction samples from a retail computer and having them printed locally via a printer at that same retail location.

Also, the webpage 112 of FIG. 9 may also include standard kits of construction products that are fairly commonly used (e.g., a kit of light wood floor samples, a kit of medium wood floor samples, and a kit of dark wood floor samples). Thus, rather the creating a custom kit, the consumer may select from one or more standard kits of various types of construction productions on the webpage 112. Also, it should be noted that, although the kits herein have been illustrated with five pre-construction product samples, all the standard and custom kits can have more or less than five pre-construction product samples.

It should be noted that while the construction products of flooring, cabinets, countertops, decks, windows, shingles, and appliances have been shown for purposes of illustration, other types of construction products are contemplated within the spirit and scope of the present invention. For example, wallpaper, large-scale painted walls, brick, and stone surfaces (e.g. backsplashes) can be replicated as well.

Regarding paints, as is known, paint companies commonly supply small sample cards (e.g. a 2 inch by 2 inch color sample with 3 color samples per card). Yet, placing them against a wall provides very little opportunity for the consumer to visualize how that color will look in a room, especially when considering how light (direct and reflected light) affects the appearance of the color. Oftentimes, consumers simply purchase a few one-quart containers of alternative paints and paint a few square feet of a wall to see how it looks. Considering the high-quality resolution of the pre-construction samples described above, the use of a kit of large-scale, pre-construction paint samples would avoid the need to purchase these one-quart samples as well as the associated painting work that is required. Furthermore, the various large-scale, pre-construction paint samples can be hung at various locations on the wall (not just one location where a consumer typically paints a few square feet) to see how it looks against existing wood trim, curtains, cabinets, furniture, etc. within the room. It should be noted that the present invention contemplates that the pre-construction paint samples may be manufactured from glossy paper having different coatings (e.g. aqueous coatings, UV coatings, varnishes, laminates, etc.) to better replicate the type of paint finish, such as semi-gloss, gloss, eggshell, satin, etc. Hence, the present invention also contemplates the use of kits of pre-construction paint samples that help the consumer to determine the type of finish that he or she would prefer. Regarding carpets, the present invention contemplates the use of pre-construction carpet samples that are usable by the consumer. In addition to color, the variations in carpets are created by characteristics such as the type of loops (e.g., half loops and full loops) and the height of the loops. Pre-construction carpet samples have images of carpets in which the texture characteristics are substantially scaled on a one-to-one basis with the texture characteristics of the actual carpet. Hence, when laid over the consumer's existing floor, the pre-construction product sample very closely replicates the actual carpet.

Furthermore, while the present invention has focused on a certain standard size of sample, multiple sizes of the samples are contemplated as well. For example, a consumer may determine that he or she desires a very large, pre-construction countertop sample 65, one that would cover the length of an entire countertop (e.g., 10 feet long). Likewise, the consumer may also determine that he or she desires a very large, pre-construction cabinet sample 45 of a similar length, one that provides images of multiple cabinets. The consumer may even select what style and hinge orientation of each cabinet within the pre-construction cabinet sample 45. Once the consumer has these two samples in hand, they can be laid over a large portion of the consumer's existing kitchen countertop and existing cabinets to provide a very realistic, large-scale visualization of what the final product would look like if the consumer chose to move forward with the actual cabinets and countertops corresponding to the pre-construction cabinet sample 45 and pre-construction countertop sample 65, respectively. Considering the costs associated with such cabinets and countertops are often several thousand dollars, the consumer's use of low cost samples helps to guarantee that the results achieved will meet the consumer's expectations. In the situation in which the consumer desires the larger-than-normal pre-construction samples, the consumer would typically be charged on a per-linear-foot or per-square foot basis for the size of the sheet that he or she desires. While the preconstruction samples of FIGS. 1-18 would provide assistance with marketing the various home options in a display home in a new neighborhood, these very large pre-construction samples would allow the kitchens and bathroom areas to be dramatically altered to assist with consumer selection.

It should also be noted that the pre-construction product samples described above can be laminated to provide protection so that they can be repeatedly used without much damage to the surface containing the images of the construction product. Furthermore, it is possible to place the product samples in a larger booklet for transportation and storage.

It should also be noted that the present invention contemplates the method of making the pre-construction product samples. The method would include acquiring the image (e.g., via photograph or photographs) of the construction product and manipulating the image to provide a version of the image in which the product's characteristics within the image are of substantially the same scale as the characteristics of the actual product when printed on a large scale substrate having dimensions greater than 18 inches in length and/or width. Once the image has been so manipulated, it can then be printed on the substrate (e.g., 80 lb gloss paper) at a resolution of at least 200 dpi and preferably, at least 300 dpi.

Furthermore, the present invention provides an additional manufacturing benefit by placing a single image on one sheet of flexible material. Oftentimes, the manipulation of the image involves color matching the image to the actual product (e.g. matched to the stain of a certain wood, or matched to the color of a certain countertop). By placing a single image on a one piece of flexible materials (or one side if both sides are used), the color matching process is much easier. If more than one image were printed on the flexible material, then changing the color of a first image can affect the color of the second image. In short, if more than one image were printed on the flexible material, it is hard to balance the color matching process of both images.

Each of these embodiments and obvious variations thereof is contemplated as falling within the spirit and scope of the claimed invention, which is set forth in the following claims.

What is claimed is:

1. A kit of pre-construction wood-flooring samples, comprising:
a plurality of pre-construction wood-flooring samples, each of the pre-construction wood-flooring samples being made of a flexible material and having a substantially flat primary surface that includes a wood-flooring image replicating a wood-flooring product, the primary surface defined by a width and a length and the primary surface being substantially flat across the wood-flooring image, at least one of the width or the length for each of the pre-construction wood-flooring samples being at least 18 inches, each wood-flooring image being substantially on a 1:1 scale with the corresponding wood-flooring product being replicated and having multiple wood plank images with width dimensions that substantially correspond to width dimensions of wood planks of the wood-flooring product being replicated, each of the wood-flooring samples including a coating over the wood-flooring image so that the wood-flooring sample better matches the reflectivity of the corresponding wood-flooring product than the flexible material on which the wood-flooring image has been printed, the kit including pre-construction wood-flooring samples having different characteristics, the different characteristics at least including different colors corresponding to the different wood-flooring products being replicated; and
wherein each of plurality of pre-construction wood-flooring samples within the kit is a distinct sample corresponding to a single wood-flooring product such that a user can independently place each of the wood-flooring samples on an existing floor in a manner that permits the wood-flooring image to be visualized by the user.

2. The kit of claim 1, wherein the flexible material is paper and the coating increases the glossiness of the wood-flooring sample to better match the reflectivity of the corresponding wood-flooring product.

3. The kit of claim 1, wherein each of the wood-flooring samples has a surface opposing the primary surface, and wherein the opposing surface of each of the wood-flooring samples includes an additional wood-flooring image such that each of the wood-flooring samples includes wood-flooring images on both sides.

4. The kit of claim 1, wherein the wood-flooring image extends across substantially the entirety of the primary surface.

5. The kit of claim 1, wherein the different characteristics of the wood-flooring products being replicated are different stains.

6. The kit of claim 1, further including a tube for containing the wood-flooring samples for transportation, each of the wood-flooring samples is rolled in a manner such that the wood-flooring image is on an outward side of the roll.

7. The kit of claim 1, wherein each of the wood-flooring images is produced by a printing process having at least 300 dpi.

8. The kit of claim 1, wherein the wood-flooring samples are placed in a booklet for transportation and storage.

9. The kit of claim 1, wherein the flexible material is a glossy paper and the coating dulls the wood-flooring sample to better match the reflectivity of the corresponding wood-flooring product.

10. The kit of claim 1, wherein the different characteristics of the wood-flooring products being replicated include different types of wood.

11. The kit of claim 1, wherein the different characteristics of the wood-flooring products being replicated include different sizes of wood planks.

12. A kit of pre-construction wood-flooring samples, comprising:
- a plurality of pre-construction wood-flooring samples, each of the pre-construction wood-flooring samples having a primary surface that includes a wood-flooring image replicating a wood-flooring, the primary surface defined by a width and a length and the primary surface being substantially flat across the wood-flooring image, the wood-flooring image extends across substantially the entirety of the primary surface and being an image of only a single wood-flooring product, the wood-flooring image including wood-plank images that are approximately the same size as the wood planks of the corresponding wood-flooring product, the wood-flooring samples within the kit having different stain colors corresponding to the different wood-flooring stains being replicated by the different wood-flooring samples within the kit;
- wherein each of the plurality of pre-construction wood-flooring samples within the kit is made of a flexible material such that a user can independently place each of the wood-flooring samples on an existing floor while the user visualizes the wood-flooring sample; and
- wherein each of the wood-flooring samples includes a coating over the wood-flooring image so that the wood-flooring sample better matches the reflectivity of the corresponding wood-flooring product than the flexible material on which the wood-flooring image is printed.

13. The kit of claim 12, wherein the wood-flooring products being replicated by the kit include wood-flooring products having different types of wood.

14. The kit of claim 12, wherein the wood-flooring products being replicated by the kit include wood-flooring products having different sizes of wood planks.

15. The kit of claim 12, wherein the primary surface further includes a label section directly adjacent to the wood-flooring image and extending entirely across one of either the width or the length of the primary surface.

16. The kit of claim 12, wherein the wood-flooring samples are placed in a booklet for transportation and storage.

17. The kit of claim 12, wherein the kit is a custom kit produced through the user's selection of pre-construction samples via interaction on a website.

18. The kit of claim 12, wherein the flexible material is a glossy paper and the coating dulls the wood-flooring sample to better match the reflectivity of the corresponding wood-flooring product.

19. The kit of claim 12, wherein the flexible material is paper and the coating increases the glossiness of the wood-flooring sample to better match the reflectivity of the corresponding wood-flooring product.

20. The kit of claim 12, further including a tube for containing the wood-flooring samples for transportation, each of the wood-flooring samples is rolled in a manner such that the wood-flooring image is on an outward side of the roll.

* * * * *